United States Patent [19]

Gentile et al.

[11] Patent Number: 5,720,421
[45] Date of Patent: Feb. 24, 1998

[54] ELECRONICALLY CONTROLLED HIGH SPEED PRESS FEED

[75] Inventors: Joseph P. Gentile; Vaughn H. Martin; Daniel G. Lukas, all of Pittsburgh, Pa.

[73] Assignee: Vamco Machine & Tool, Inc., Pittsburgh, Pa.

[21] Appl. No.: 349,877

[22] Filed: Dec. 6, 1994

Related U.S. Application Data

[63] Continuation-in-part of Ser. No. 202,513, Feb. 28, 1994, abandoned.

[51] Int. Cl.$^6$ .................... B65H 23/16; B65H 20/00
[52] U.S. Cl. .................... 226/35; 226/124; 226/155; 226/187
[58] Field of Search .................... 226/32, 35, 124, 226/153, 154, 155, 187; 324/207.17, 207.25, 233; 250/231.16, 231.13, 231.14

[56] References Cited

U.S. PATENT DOCUMENTS

| | | | |
|---|---|---|---|
| 181,632 | 8/1876 | Brock | 100/218 |
| 3,707,255 | 12/1972 | Ridfway et al. | 226/136 |
| 3,758,011 | 9/1973 | Gentile et al. | 226/142 |
| 3,782,618 | 1/1974 | Voorhees | 226/155 |
| 3,784,075 | 1/1974 | Portman | 226/143 |
| 4,030,961 | 6/1977 | Straeten et al. | 100/170 |
| 4,034,797 | 7/1977 | Yu | 226/189 |
| 4,058,154 | 11/1977 | Streubel et al. | 226/187 |
| 4,064,435 | 12/1977 | Stebbins | 250/231 |
| 4,078,416 | 3/1978 | Voorhees et al. | 72/417 |
| 4,127,066 | 11/1978 | Sharkey | 100/168 |
| 4,133,216 | 1/1979 | Gentile et al. | 74/384 |
| 4,134,334 | 1/1979 | Johnson | 100/216 |
| 4,138,913 | 2/1979 | Gentile et al. | 83/236 |
| 4,316,569 | 2/1982 | Gentile | 216/158 |
| 4,511,884 | 4/1985 | Serev et al. | 340/347 |
| 4,594,540 | 6/1986 | Currie et al. | 318/661 |
| 4,776,505 | 10/1988 | Kato | 216/152 |
| 4,788,908 | 12/1988 | Suliyama et al. | 100/47 |
| 4,793,250 | 12/1988 | Niskanen | 100/170 |
| 4,831,510 | 5/1989 | Dummermuth et al. | 364/167.01 |
| 4,848,636 | 7/1989 | Kato | 226/152 |
| 4,869,411 | 9/1989 | Kato | 216/142 |
| 4,923,139 | 5/1990 | Bulso, Jr. et al. | 242/78.6 |
| 4,933,674 | 6/1990 | Gasperi et al. | 341/116 |
| 4,961,035 | 10/1990 | Inaba et al. | 318/600 |
| 4,972,186 | 11/1990 | Morris | 340/870.25 |
| 4,983,899 | 1/1991 | Komatsu et al. | 318/571 |
| 5,033,342 | 7/1991 | Nordlof | 83/73 |
| 5,034,743 | 7/1991 | Deppe et al. | 341/116 |
| 5,121,116 | 6/1992 | Taniguchi | 341/116 |
| 5,134,397 | 7/1992 | Eyerly et al. | 341/116 |
| 5,134,404 | 7/1992 | Peterson | 341/116 |
| 5,145,169 | 9/1992 | Kato | 271/272 |
| 5,150,022 | 9/1992 | Waddington | 318/563 |
| 5,162,798 | 11/1992 | Yundt | 341/116 |
| 5,181,642 | 1/1993 | Gentile et al. | 226/137 |
| 5,197,645 | 3/1993 | Nordlof | 226/154 |

*Primary Examiner*—Daniel P. Stodola
*Assistant Examiner*—Matthew A. Kaness
*Attorney, Agent, or Firm*—Reed Smith Shaw & McClay LLP

[57] ABSTRACT

A press feed apparatus for use in feeding stock material to a high speed automatic press. The feed roller is driven by a servo motor integral with the shaft of the roller, the feed roller release mechanism is infinitely adjustable, and a feedback system is used to accurately determine the position of various shafts. The apparatus is controlled electronically, by a microprocessor or the like, which permits the press feed to be electronically geared to the press and accurately operate at high speeds.

40 Claims, 20 Drawing Sheets

ELECRONICALLY CONTROLLED HIGH SPEED PRESS FEED

This is a continuation-in-part of application Ser. No. 08/202,513 filed on Feb. 28, 1994, now abandoned.

FIELD OF THE INVENTION

The present invention relates generally to press feeds for feeding stock material into a stamping press and more particularly to an electronically controlled press feed which feeds material into a stamping press at high speeds.

BACKGROUND OF THE INVENTION

A press feed is often used in connection with an automatic stamping press to feed coiled stock material into the press. A common method of feeding the stock material into the press is bypassing it through a pair of feed rollers which apply friction to the material, and rotate in a cooperative manner to feed the stock into the press. By synchronizing the rotation of the feed rollers to the speed of the press, the stock material is fed into the press at the proper rate.

When a press is performing a punching operation, it is often desirable to align the punched holes as accurately as possible. One method of doing this uses pilot pins in the press which contact the material shortly before the press actually punches the material. The pilot pins are positioned to contact the material in a region where holes have already been punched by the press. The material is advanced to approximately the correct location by the press feeder. More precise positioning of the material then occurs as the pilot pins enter the previously punched holes, and draw them into alignment with the pilot pins. However, for this alignment to take place, the tension applied to the stock material by the feed rollers of the press feed must be removed.

The speed at which a press may operate is limited by several factors, however, including the manner in which the feed rollers are driven, the manner in which the advancement of the material by the feed rollers is synchronized to the press stroke, the manner in which the feed rollers are released from the stock material during the pilot pin alignment, and the manner in which the release of the feed rollers is synchronized to the press stroke.

SUMMARY OF THE INVENTION

In accordance with the present invention, an apparatus is provided for feeding stock into a press. A first feed roller is rotatably secured to a housing and is formed integral with means for driving the roller. By having the driving means formed integral with the feed roller, the speed of advancement may be more precisely controlled. A second feed roller is positionally adjacent to the first feed roller, allowing stock material to be fed through the feed rollers under tension from the rollers. Thus, an equal and opposite rotation of the rollers, in cooperation with one another, results in an advancement of the stock material through the apparatus.

For use with pilot pin adjustment, the present invention releases tension on the stock material. Such release is accomplished by means of the second feed roller, which is secured to a movable support. By moving the support in a first direction, the second feed roller is caused to move away from the first feed roller. The movement of the support is accomplished by a servo motor which permits infinite variability of the movement. This eliminates a disadvantage of the prior art in which the movement of the second feed roller from the first feed roller is controlled by a cam follower, and which has to undergo a mechanical adjustment when stock material of differing thicknesses was to be fed to a press.

Sensors, preferably resolvers or optical encoders, are used to sense the shaft angles (positions) of the press, the servo motor used to drive the first feed roller, and the servo motor used to control the movable support which releases the tension the second feed roller applied to the stock material during pilot pin adjustment. While the use of resolvers or optical encoders to determine shaft angles is known, the present invention uses, inter alia, simultaneous sampling of the output signals to compute the angular shaft position with greater accuracy than has heretofore been obtained.

Furthermore, the system of the present invention is electronically controlled by a microprocessor. Such control permits the tension of the feed rollers on the stock material to be released during pilot pin adjustment in synchronization with the press stroke, without mechanical linkage to the press itself, and permits stable operation of the press and press feed at high speeds.

DETAIL DESCRIPTION OF THE PREFERRED EMBODIMENT

Figure 1:
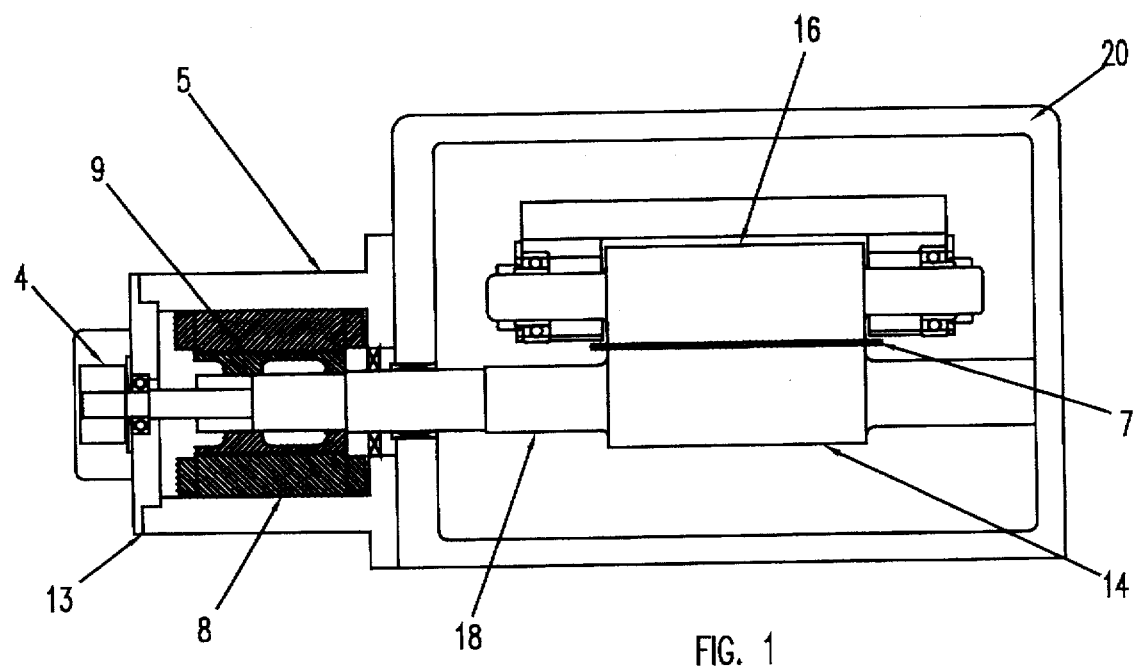
FIG. 1 is a front elevation view of two press feed rollers, with the first roller being driven by a servo motor formed integral with the roller.

Shown in FIG. 1 is the feed roller driving mechanism of the present invention. A drive force is applied to feed roller 14, which rotates cooperatively with feed roller 16 to apply motive force to stock material 7 passing between the feed rollers. The drive force is supplied by a servo motor 13 built integral with feed roll shaft 18. Sensor 4 is included for determining the position of the driven roll shaft. Preferably, servo motor 13 should be a special ultra high torque (12 pole) motor built directly onto the roll shaft 18. The stator windings 8 of servo motor 13 are preferably mounted in housing 5 which is rigidly attached to frame 20.

This approach eliminates the bandwidth limitations of belts, pulleys and flexible couplings. The rotor windings 9 of servo motor 13 are preferably attached to roll shaft 18. The rotor magnets are practically (not actually) mounted right on the roll shaft. This yields a system bandwidth which is 100 to 1000 times higher than the direct coupling method shown in FIG. 3. The approach of the present invention uses a motor which has a perfect speed output vs. torque output characteristics. 4, 6, 8, 12 and 18 pole motors ranging from 1.25" to 10" outside diameters and any practical stack length may be used. Accordingly, the motor (in every way) is designed perfectly to the application. Moreover, such a motor is smaller, lighter, less expensive and more reliable than the motors used in the conventional belt/pulley and direct drive approaches.

Figure 2:
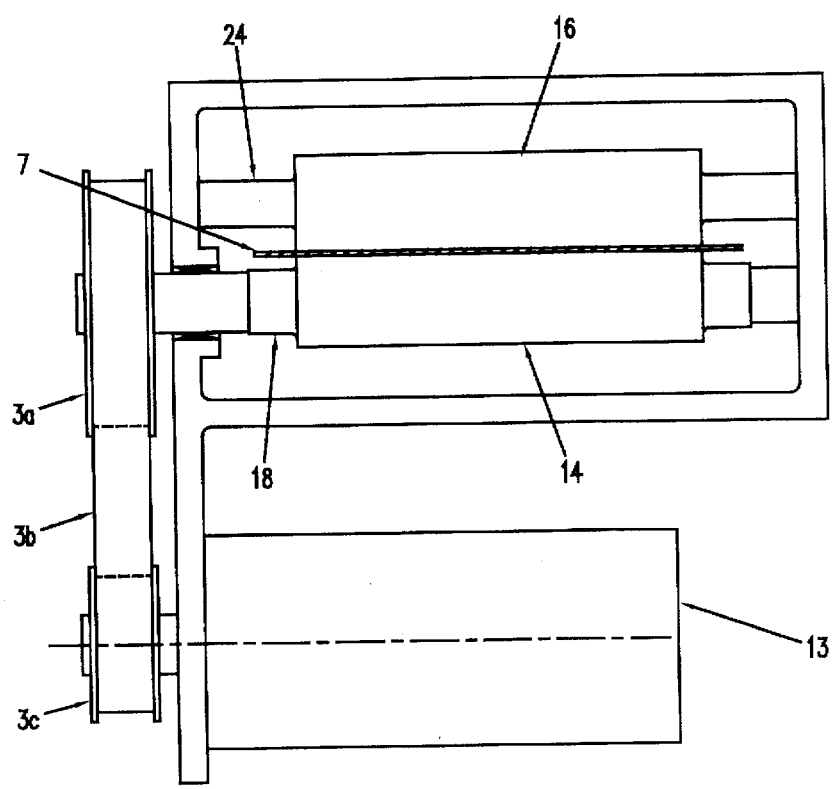
FIG. 2 is a front elevation view of two press feed rollers, with the first roller being driven by a belt/pulley arrangement.

FIG. 2 depicts the conventional belt/pulley drive approach used in press feeds. A drive force is applied to feed roller 14, which rotates cooperatively with feed roller 16 to apply motive force to stock material 7 passing between the feed rollers. The drive force is supplied by a servo motor 13. The drive force is transferred between servo motor 13 and feed roller 14 by means of a timing belt 3b and pulleys 3a and 3c.

In a belt/pulley system, the reflected inertia (load inertia) is reduced by the square of the pulley ratio. This is advantageous for systems with poorly designed (high inertia) rolls. The motor speed is better matched to the roll speed. Most off-the-shelf servo motors are designed for a 3000 to 6000 RPM speed range and the average roll feed needs to reach top speeds in the range of 500 to 1000 RPM. A pulley reduction of 2:1 to 4:1 matches the standard (low torque/high speed) servo motor to the feed quite well.

Despite these two advantages belt driven systems perform rather poorly. Although the inertia reduction helps control poorly designed (high Inertia) rolls, it has diminishing advantages on well designed (thin wall, low inertia) rolls. This is because the motor/pulley/belt dynamics become the dominate limiting factor, not the roll/material inertia. In short, the solution becomes the problem. The pulley/belt arrangement has a fairly low bandwidth and low, under damped, resonant frequency. This creates some major problems in high strokes per minute systems (above 400 SPM).

Figure 3:
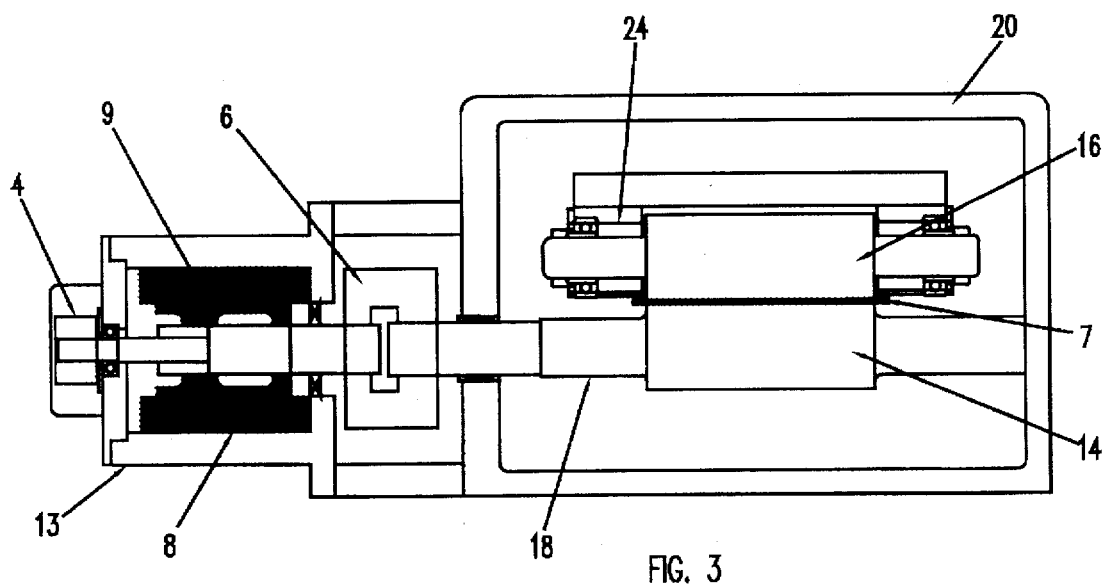
FIG. 3 is a front elevation view of two press feed rollers, with the first roller being driven by a conventional direct drive servo motor, through a flexible coupling.

FIG. 3 depicts the conventional direct drive approach used in press feeds. A drive force is applied to feed roller 14, which rotates cooperatively with feed roller 16 to apply motive force to stock material 7 passing between the feed rollers. The drive force is supplied by a servo motor 13. The drive force is transferred between servo motor 13 and feed roll shaft 18 by means of flexible coupling 6.

In the conventional direct drive approach, an off-the-shelf servo motor is typically coupled to feed roller 14 with a low backlash/low inertia flex-coupling. This approach is better than the belt/pulley system because it eliminates the low under damped resonant frequency of the belt. Most direct drive system on the market today out perform their belt driven counter parts at a substantial price increase.

There are, however, disadvantages to the conventional direct drive approach. When you go to the direct drive method you loose the two advantages of the belt/pulley arrangement mentioned above. The first advantage (inertia Reduction) is not that important because a good roll design can substantially reduced load inertia. The second advantage loss is a big one because standard and even specialized servo motors are designed for high speed output relative to torque output. This is more a matter of packaging then anything else. Thin, long motors are the standard and are easier for most manufactures to bolt on. These motors have low pole counts, (poles are related to the number of magnets around the rotor) typically 4 poles. This low pole count inherently gives the motors low torque and high speed characteristics. This forces press feed manufactures to go to expensive, large frame size motors to get the required torque. Perhaps the biggest disadvantage to conventional direct drive approach is that the overall system bandwidth is not substantially increased. The flexible coupling between the motor and feed, no matter how good, introduces backlash and an overwhelming spring constant. This causes some real problems in the servo loop. Although this system may have low roll inertia, enough motor torque and way more than enough motor speed, it can not get anywhere near its potential because of servo instability problems.

Figure 4:
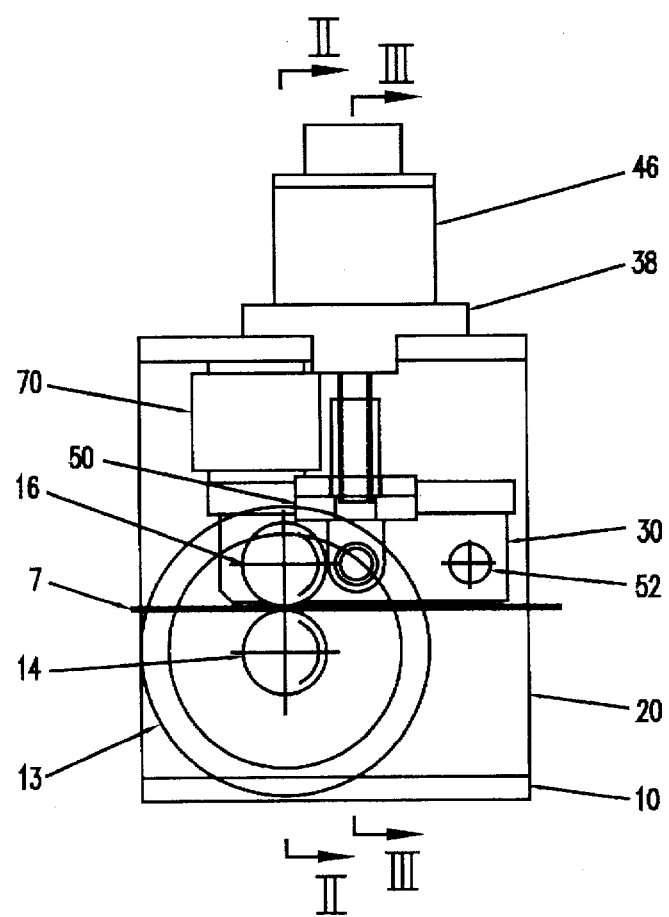
FIG. 4 is a side elevation view of a press feed having two press feed rollers, with the second roller connected to a movable support in accordance with the present invention.
Figure 5:
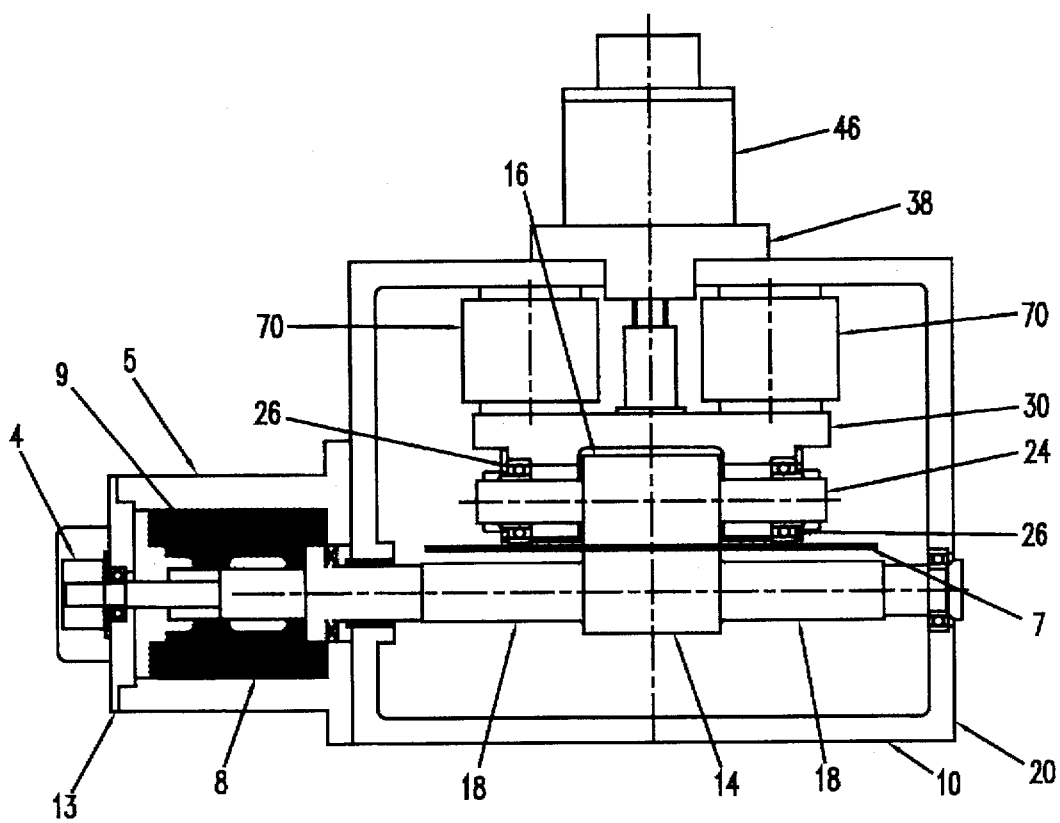
FIG. 5 is a view taken along line II—II of FIG. 4.
Figure 6:
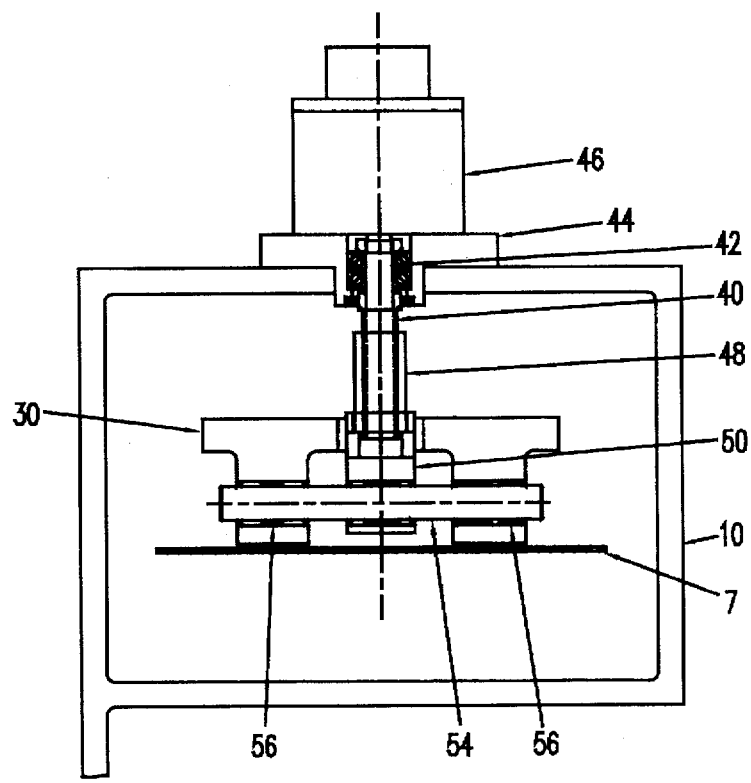
FIG. 6 is a view taken along line III—III of FIG. 4.

Referring to FIGS. 4 through 6, there is depicted a presently preferred embodiment of a press feed, identified herein by reference numeral 10, constructed according to the instant invention.

Press feed 10 delivers strip-like metal stock material 7 in incremental lengths to a press 11 (schematically shown in FIG. 21) whereas the stock material passes through one or more dies which perform stamping operations on the stock material. In accordance with the present invention, press feed 10 includes the feed roller driving mechanism of the present invention. A drive force is applied to feed roller 14, which rotates cooperatively with feed roller 16 to apply motive force to stock material 7 passing between the feed rollers. The drive force is supplied by a servo motor 13 built integral with feed roll shaft 18. Sensor 4 is included for determining the position of the driven roll shaft.

The press feed 10 further comprises stock material engagement means, preferably in the form of feed rolls 14 and 16, which clamp and incrementally advance the stock material to the press in preselected incremental lengths. According to the preferred and illustrated mode of operation, feed rolls 14 and 16 advance the stock material linearly via noncontinuous and nonoscillating, stepwise, intermittent, rotational movement of the feed rolls which are driven by servomotor 13. It will be understood, however, that the press feed of the present invention need not be limited in its applicability to servo driven feed rolls, but can employ any roll or gripper feed such as where the feed means are supplied with power from the press by means of an appropriate power transmission means such as a gear, belt or chain coupled directly to the press crankshaft. The feeder will therefore appreciate that the manner by which the feed rolls 14 and 16 are driven is not critical to the roll release mechanism of the present invention and thus will not be discussed in depth except where necessary to provide a proper understanding of the invention. Likewise, in the situation where the press feed is constructed and functions as an oscillating type feed, there will be other stock material engagement means, namely clamping means, which engage the stock material during return of the feed rolls. In that case, the structure and function of the stock material release mechanism described hereinafter is equally adaptable to such other stock material engagement means.

Rolls 14 and 16 clamp and pull the stock material from a supply source such as a coil or the like while simultaneously advancing the material to the press. As depicted most clearly in FIG. 5, feed roll 14 is integrally connected to a first shaft 18 which is rotatably supported by suitable bearings in a press feed housing 20.

Feed roll 16 is integral with a second shaft 24. Second shaft 24 is supported for rotation in bearings 26 which are carried by the pivot frame of the roll release mechanism of the present invention. Hence, the feed roll 16 is mounted so as to pivot with the pivot frame 30.

In a typical feeding operation, the feed roll 14 (the "driven" feed roll by virtue of its connection to servo motor 13 through first shaft 18) is rotated in a counter-clockwise direction as shown in FIG. 4, whereas feed roll 16 (the "idler" roller by reason of its freely rotatable status) is rotated in a clockwise direction through its frictional and clamping contact with the upper surface of the stock material.

The stock material release mechanism of the press feed of the present invention has an essential feature thereof means for separating the stock material engagement means, e.g. feed rolls 14, 16, clamping means, or the like, from engagement with the stock material upon detection of the onset of at least one selected phase of a press cycle, and for urging the stock material engagement means into gentle reengagement with the stock material upon detection of the termination of the selected press cycle phase. The only press cycle phase during which the feed rolls 14 and 16 of the press feed 10 are released from engagement from the stock material is the piloting phase. However, the stock material release mechanism disclosed herein is equally adaptable to stock material clamping means of the sort used in oscillating type press feeds to clamp the strip during the press cycle phase corresponding to that period of time when the oscillating feed rolls are returned to their ready position.

In any case, the stock material release mechanism which separates the stock material engagement means from engagement with the stock material and urges the stock material engagement means into gentle reengagement with the stock material preferably comprises a combination of interrelated components functioning in concert to effect the desired objectives of the present invention.

More specifically, the stock material release mechanism desirably includes at least one infinitely variable actuator 38 ("infinitely variable" meaning infinitely adjustable within the expected working parameters of the press feed 10). According to a presently preferred embodiment, an actuator consists of screw 40 integrally joined to first ends of actuator shaft 42 rotatably supported by suitable bearings in actuator housing 44 attached to the press feed housing 20. The opposite end of the actuator shaft is drivenly connected to the output shaft of actuator drive means 46 which is a high speed, reversible servomotor. The presently preferred embodiment utilizes one infinitely variable actuator 38, however, the press feed of the present invention is not limited to the use of one variable actuator. Instead two or more infinitely variable actuators may be utilized.

Referring to FIGS. 4 through 6, it will be seen that screw 40 threadedly engages internally threaded means 48 such as a nut or the like affixed atop pillow block 50 A shaft 54 is supported for rotation in bearings 56 which are carried by pivot frame 30. The pivot frame 30 is supported for pivotable movement about pivot shaft 52. Actuators 70 apply adjustable pressure downward on pivot frame 30 thereby causing the stock material 7 to be gripped between feed rolls 16 and 14. The presently preferred embodiment utilizes two air bags, however the actuator 70 could be at least one air bag, air cylinder, hydraulic cylinder, or spring.

As will by now be appreciated, rotation of actuator drive means 46 in a first direction effects rotation of the screw 40 to raise the shaft imparting a force upward to oppose the force generated by actuators 70 and causing pivot frame 30 and the idler feed roll 16 supported thereby to pivot upwardly about shaft 52 and separate from the stock material and driven feed roll 14. Opposite rotation of actuator drive means 46 effects the opposite result. That is, the pivot frame 30 and idler feed roll 16 pivot downwardly about pivot shaft 52 whereby the idler feed roll 16 is brought into contact with the material It will be understood, that the press feed of the present invention and, in particular, the stock material release mechanism, including variable actuators 38, is not limited in its applicability to various actuators which are integral with actuator drive means 46. Instead variable actuator 38 can be driven through appropriate power transmission means such as a gear, belt, or chain coupled directly to the output shaft of a separate, non-integral motor.

Although the presently preferred embodiment of actuator 38 consists of screw 40, and actuator shaft 42, it is understood that actuator 38 and actuator drive means 46 can be any infinitely variable actuator. These include but are not limited to servo controlled hydraulic cylinder and valve arrangements, linear servo motors and the like, linear stepper motors, voice coil servo motors, linear voice coil motors, and solenoid style linear actuators. The advantage of using a screw, however, is that with minor rotation, particularly if the thread pitch angle is relatively steep, the screw can be rapidly rotated in one direction and then in the opposite direction to bring the stock material engagement means into and out of operable contact with the stock material during selected press cycle phases, including very brief phases such as piloting.

Figure 7:
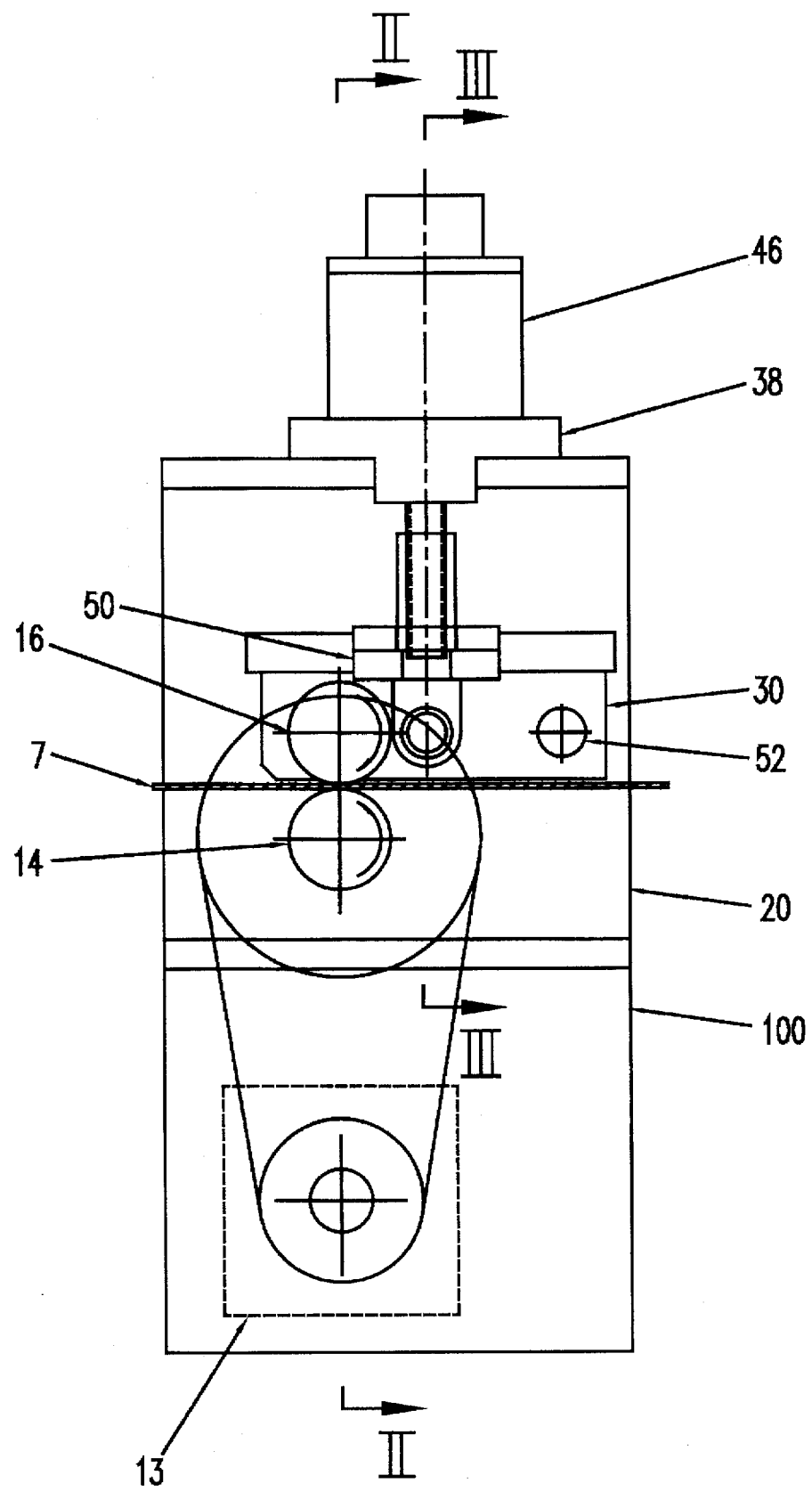
FIG. 7 is similar to FIG. 4, and depicts a side elevation view of another embodiment of a press feed having two press feed rollers, with the second roller connected to a movable support in accordance with the present invention.
Figure 8:
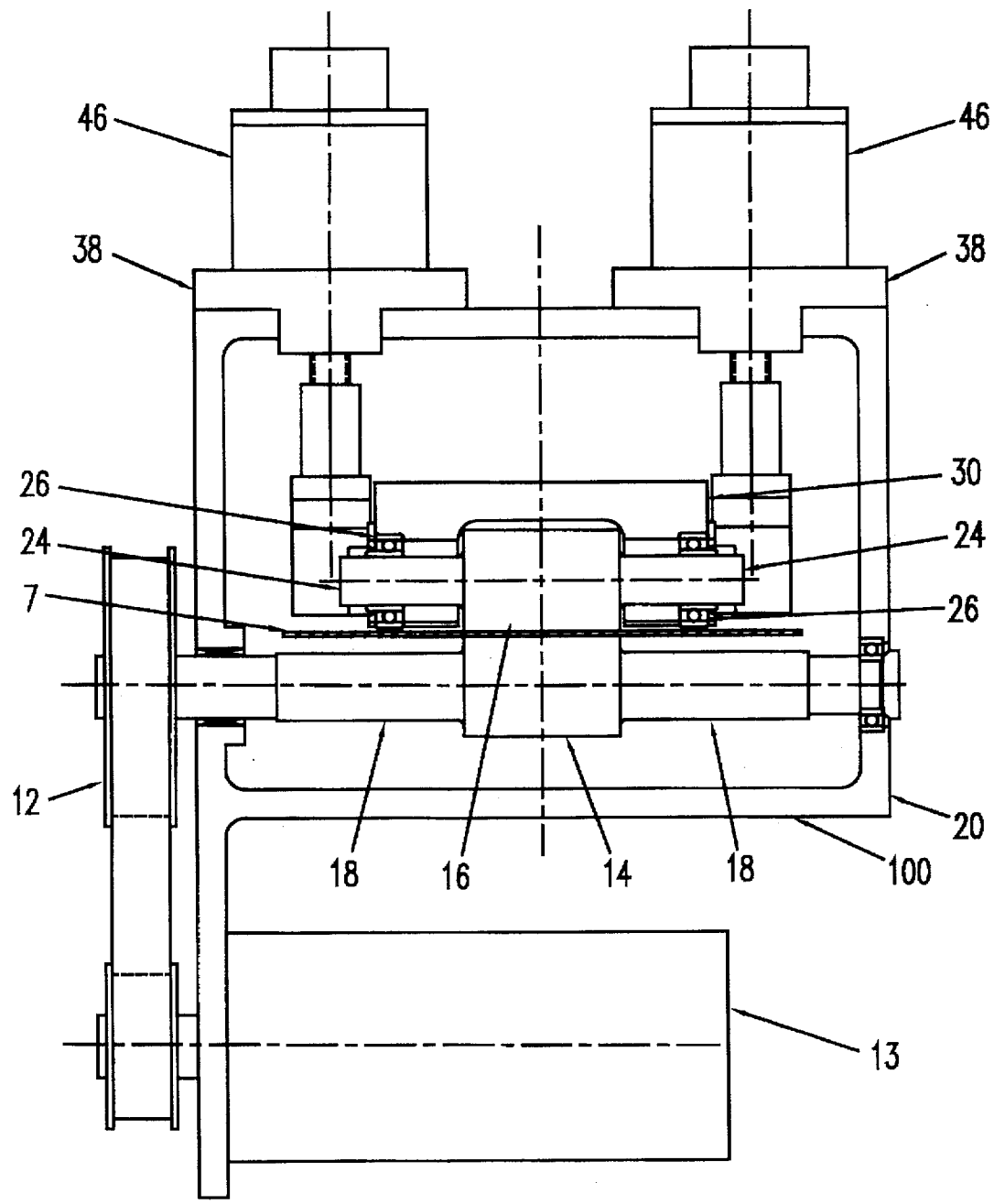
FIG. 8 is a view taken along line II—II of FIG. 7.
Figure 9:
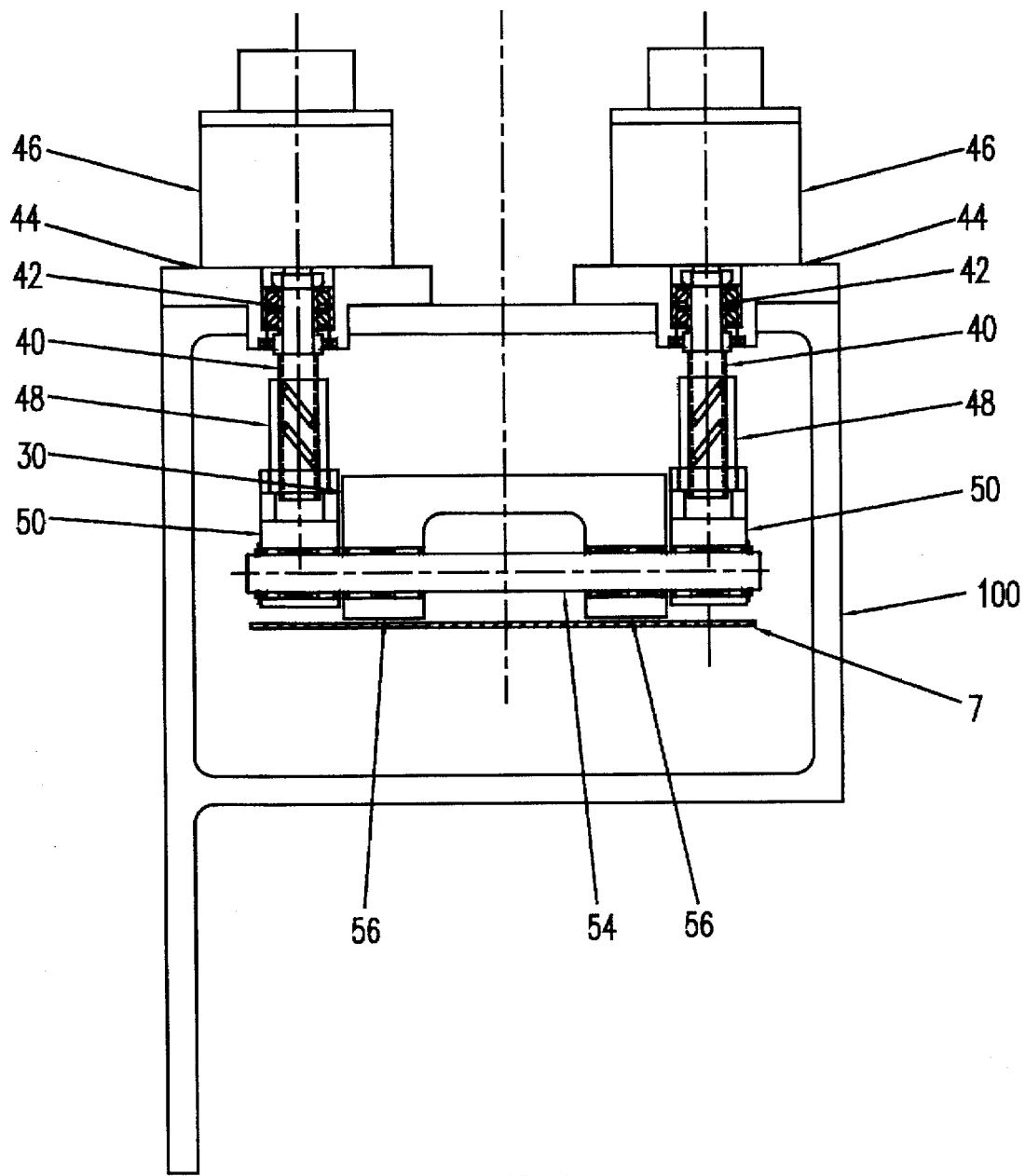
FIG. 9 is a view taken along line III—III of FIG. 7.

FIGS. 7 through 9 represent a second presently preferred embodiment of a press feed with a movable roller support constructed in accordance with the present invention, herein identified by reference numeral 100. In FIG. 7 thru 9, like references indicate similar elements having similar functions to those discussed thus far in connection with FIGS. 4 through 6. And, only those elements or functions which materially depart from their counterparts in FIGS. 4 through 6 will be described in detail.

The press feed 100 differs from press feed 10 in that actuators 70 have been removed. Unlike press feed 10, press feed 100 includes conventional drive means 12, which may be a gear, pulley or sprocket, which is driven through appropriate power transmission means such as a gear, belt or chain coupled directly to the output shaft of servomotor 13. Although not illustrated, the output shaft servomotor 13 can be drivenly connected to first shaft 18 in order to drive feed roll 14.

Infinitely adjustable actuators 38 and actuator drive means 46 provide the force exerted by idler roll 16 for gripping of the material 7 between idler roll 16 and driving roll 14. With independent operation of actuators 38, stock material of slightly non-rectangular cross-sectional configuration may be accommodated by the press feed and differential clamping force may be applied by the stock material engagement means when such is desired of necessary. It will be understood, however, that the press feed of the present invention and, in particular, the stock material release mechanism, including variable actuators 38, is not limited in its applicability to various actuators which are integral with actuator drive means 46. Instead variable actuators 38 can be driven separately or together through appropriate power transmission means such as a gear, belt, or chain coupled directly to the output shaft of a separate, non-integral motor or motors.

Although the presently preferred embodiment of actuators 38 consists of screws 40, and actuator shafts 42, it is understood that actuators 38 and actuator drive means 46 can be any infinitely variable actuators. These include but are not limited to servo controlled hydraulic cylinder and valve arrangements, linear servo motors and the like, linear stepper motors, voice coil servo motors, linear voice coil motors, and solenoid style linear actuators. The advantage of using screws, however, is that with minor rotation, particularly if their thread pitch angle is relatively steep, the screws can be rapidly rotated in one direction and then in the opposite direction to bring the stock material engagement means into and out of operable contact with the stock material during selected press cycle phases, including very brief phases such as piloting.

Figure 10:
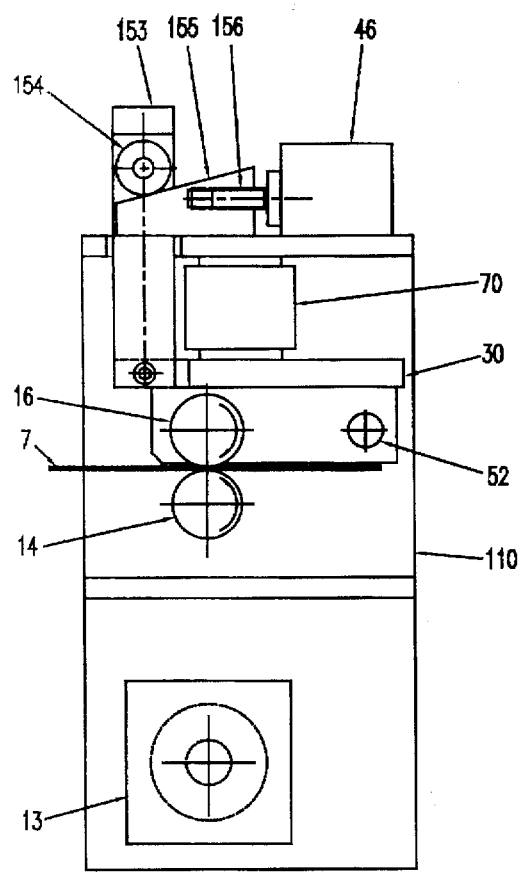
FIG. 10 is a side elevation view of another embodiment of a press feed having two press feed rollers, with the second roller connected to a pivoting movable support in accordance with the present invention

FIG. 10 represents a third preferred embodiment of a press feed constructed in accordance with the present invention, herein identified by reference numeral 110. In FIG. 10, like references indicate similar elements having similar functions to those discussed thus far in connection with FIGS. 4 through 6. And, only those elements or functions which materially depart from their counterparts in FIGS. 4 thru 6 will be described in detail. The press feed 110 differs from press feed 10 in the nature of the infinitely variable actuators used. In this embodiment, the actuators consist of follower 154 integrally joined to linkage 153, whose opposite end is attached to lever arm 30. Follower 154 rests on wedge 155, which is rotably connected to actuator drive means 46 (a high, speed reversible servo motor) by way of screw 156. In other respects, the operation of press feed 110 is essentially the same as press feed 10.

Although the presently preferred embodiment utilizes a screw 156 and rotating actuator drive means 46, it is understood that wedge 155 can be linearily reciprocated by any infinitely variable actuator. These include but are not limited to servo controlled hydraulic cylinder and valve arrangements, linear servo motors and the like, linear stepper motors, voice coil servo motors, linear voice coil motors, and solenoid style linear actuators. The advantage of using a screw, however, is that with minor rotation, particularly if the thread pitch angle is relatively steep, the screw can be rapidly rotated in one direction and then in the opposite direction to bring the stock material engagement means into and out of operable contact with the stock material during selected press cycle phases, including very brief phases such as piloting.

Figure 11:
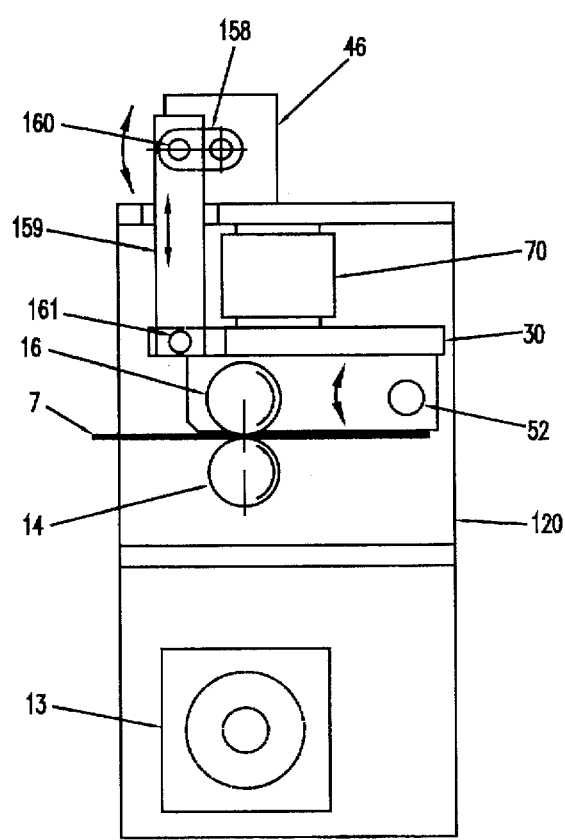
FIG. 11 is a side elevation view of another embodiment of a press feed having two press feed rollers, with the second roller connected to a movable support in accordance with the present invention.

FIG. 11 represents a fourth preferred embodiment of a press feed constructed in accordance with the present invention, herein identified by reference numeral 120. In FIG. 11, like references indicate similar elements having similar functions to those discussed thus far in connection with FIGS. 4 through 6. And, only those elements or functions which materially depart from their counterparts in FIGS. 4 through 6 will be described in detail. The press feed 120 differs from press feed 10 in the nature of the infinitely variable actuators used. In this embodiment, the actuators consist of linkage 158 integrally joined to actuator drive means 46, whose opposite end is rotably connected to linkage 159 through pivot pin 160. Linkage 159 is rotably connected at its opposite end to pivot arm 30 through pivot pin 161. In other respects, the operation of press feed 120 is essentially the same as press feed 10.

Figure 12:
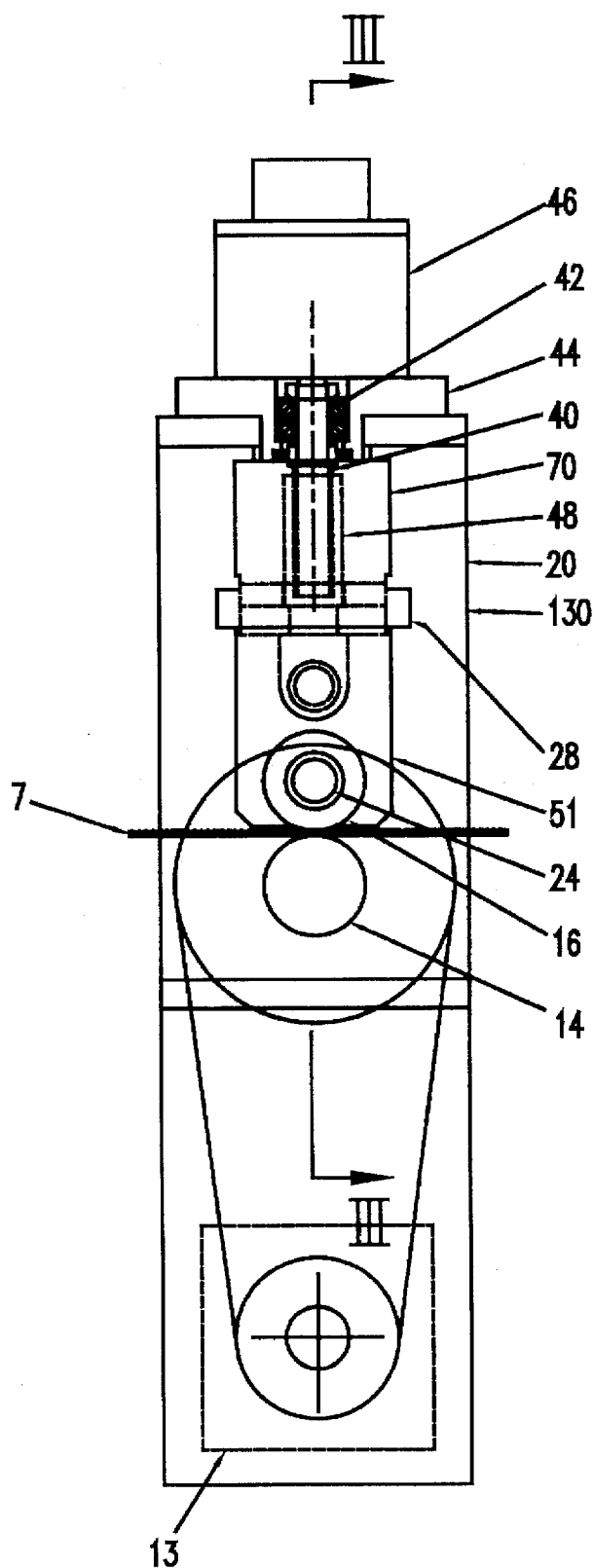
FIG. 12 is a side elevation view of another embodiment of a press feed having two press feed rollers, with the second roller connected to a movable support in accordance with the present invention.
Figure 13:
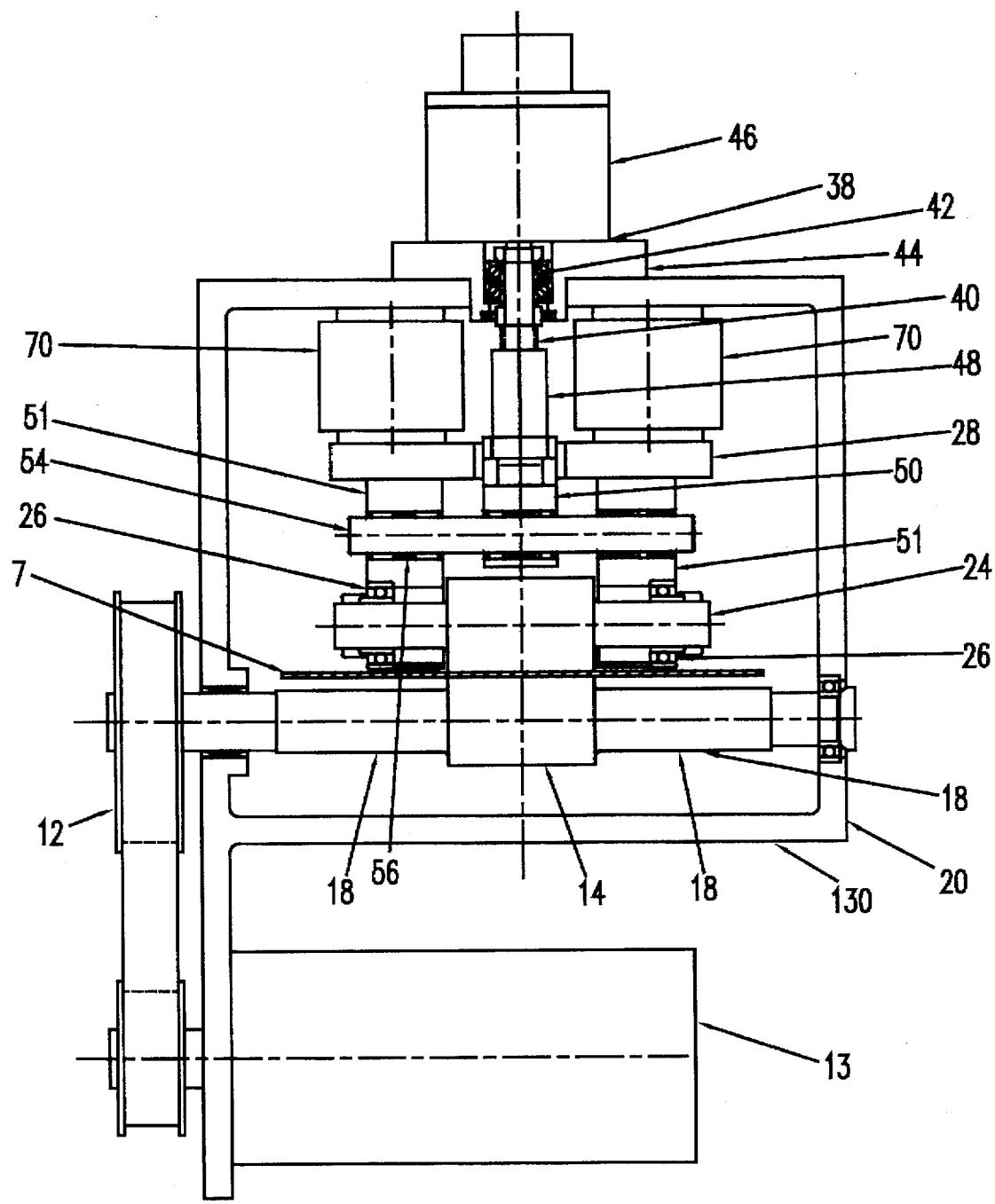
FIG. 13 is a view taken along line III—III of FIG. 12.

FIGS. 12 and 13 represents a fifth preferred embodiment of a press feed constructed in accordance with the present invention, herein identified by reference numeral 130. In FIGS. 12 and 13, like references indicate similar elements having similar functions to those discussed thus far in connection with FIGS. 4 through 6. And, only those elements or functions which materially depart from their counterparts in FIGS. 4 through 6 will be described in detail. The press feed 130 differs from press feed 10 in that the pivot frame 30 and most of its associated hardware are eliminated. Thus, the idler feed roll 16 is journalled at its opposite ends in pillow blocks 51 depending from plate 28. Pressure is applied downward on plate 28 by actuators 70, and via pillow blocks 51 and roll shaft 24, this pressure is transferred to idler roll 16. Hence, the stock material release mechanism acts to linearly reciprocate rather than pivot the feed roll 16 toward or away from the stock material and feed roll 14 upon operation of the infinitely variable actuators 38. In other respects, the operation of press feed 130 is essentially the same as press feed 10.

Figure 14:
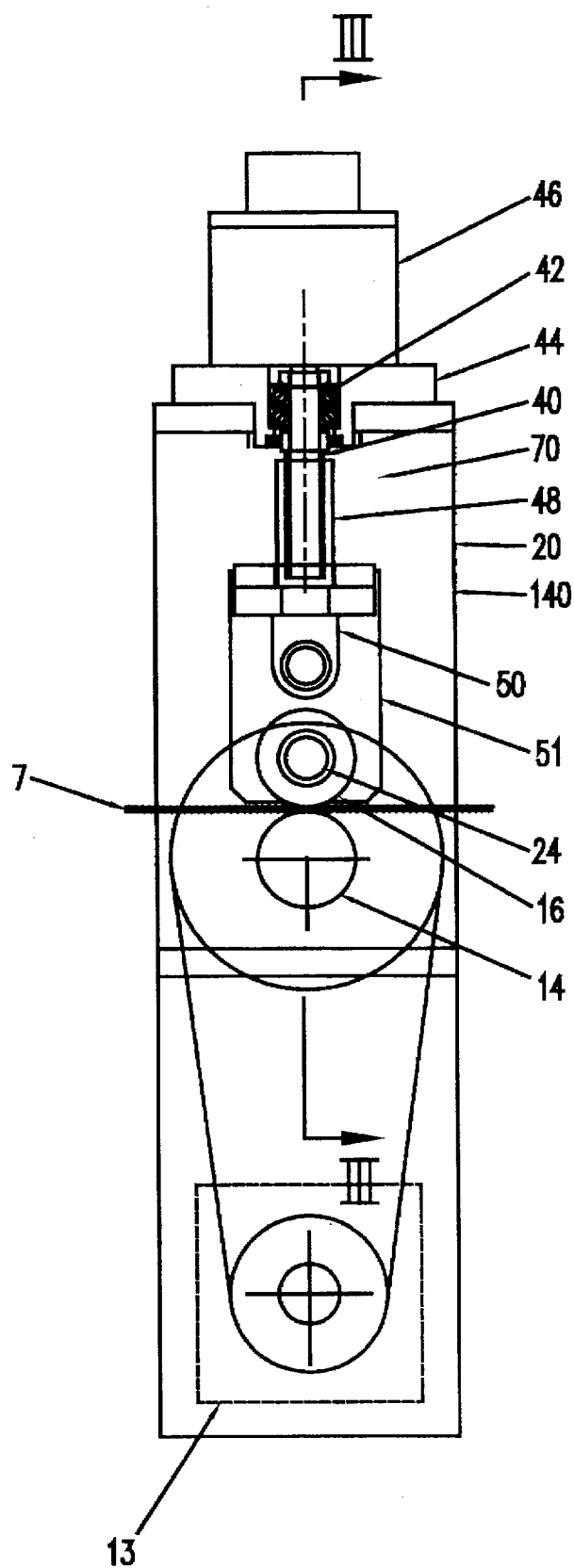
FIG. 14 is a side elevation view of another embodiment of a press feed having two press feed rollers, with the second roller connected to a movable support in accordance with the present invention.
Figure 15:
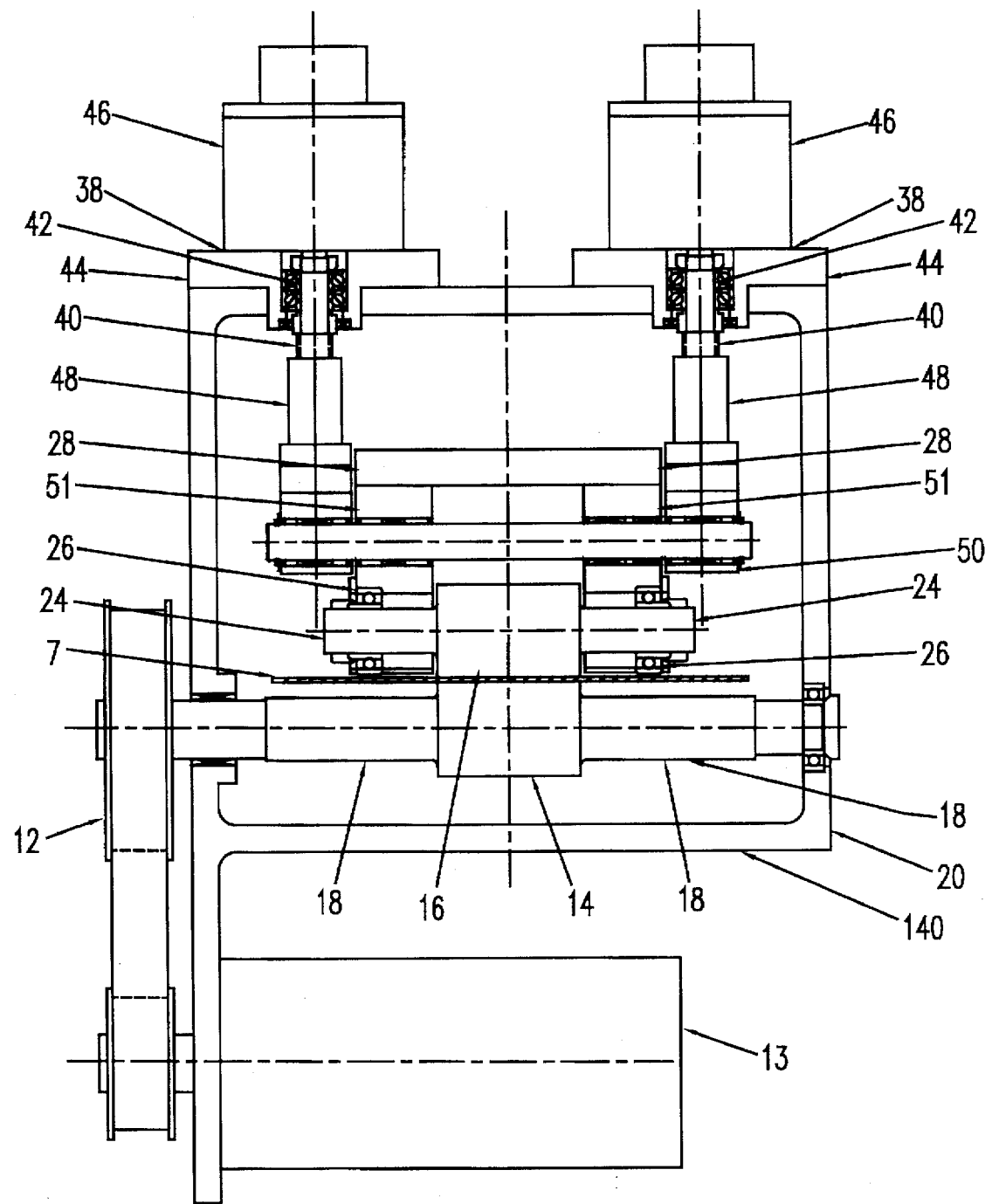
FIG. 15 is a view taken along line III—III of FIG. 14

FIGS. 14 and 15 represents a sixth preferred embodiment of a press feed constructed in accordance with the present invention, herein identified by reference numeral 140. In FIG. 14, like references indicate similar elements having similar functions to those discussed thus far in connection with FIGS. 7 through 9. And, only those elements or functions which material depart from their counterparts in FIGS. 7 through 9 will be described in detail. The press feed 140 differs from press feed 100 in that the pivot frame 30 and most of its associated hardware are eliminated. Thus, the idler feed roll 16 is journalled at its opposite ends in pillow blocks 51 depending from plate 28. Hence, the stock material release mechanism acts to linearly reciprocate rather than pivot the feed roll 16 toward or away from the stock material and feed roll 14 upon operation of the infinitely variable actuators 38. In other respects, the operation of press feed 140 is essentially the same as press feed 100.

Controlling a high bandwidth mechanical system requires an equally high bandwidth control system. This includes high bandwidth servo actuators, servo amplifiers, control algorithms and feedback devices. The preferred feedback device for the press feed industry is an electromagnestrictive device such as a resolver, synchro, Linear Variable Displacement Transducer (LVDT) or Inductosyn™ scale. These devices are inherently rugged because they consist of little more than laminated steel cores and copper windings. There is very little to break and they can withstand the severe shock and vibration of the metal stamping environment. However, very few press feed manufactures are actually using electro-magnestrictive feedback devices and none can achieve high bandwidth control loop with them (above 2000 Hz). This is because converting the feedback signals to usable position information is a rather complex and time consuming process. This process is commonly referred to as a Resolver-to-Digital Conversion or RDC.

Figure 16:
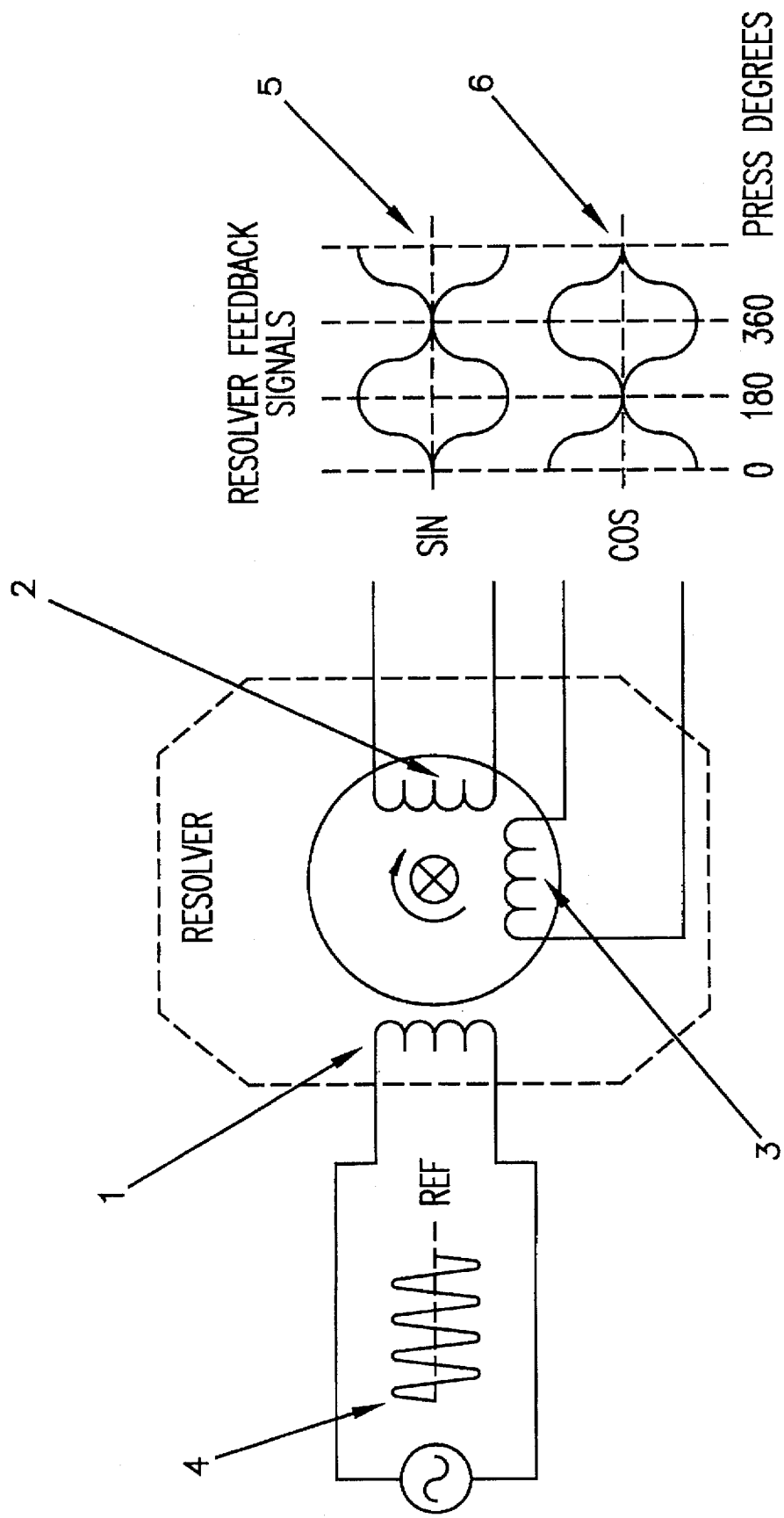
FIG. 16 is a schematical representation of a resolver with input waveform and resulting output wave forms.

FIG. 16 is a schematic for a typical resolver, LVDT or Inductosyn™. It shows a stationary stator winding (1) and two rotating rotor windings (2) and (3). The stator winding is driven with a sinusoidal signal source (4) which is commonly referred to as REF. The rotor windings produce two resulting outputs (feedback's). These two signals are commonly referred to as SIN (5) and COS (6). SIN and COS are a result of the inductive coupling of the stator winding to the rotor windings.

Figure 17:
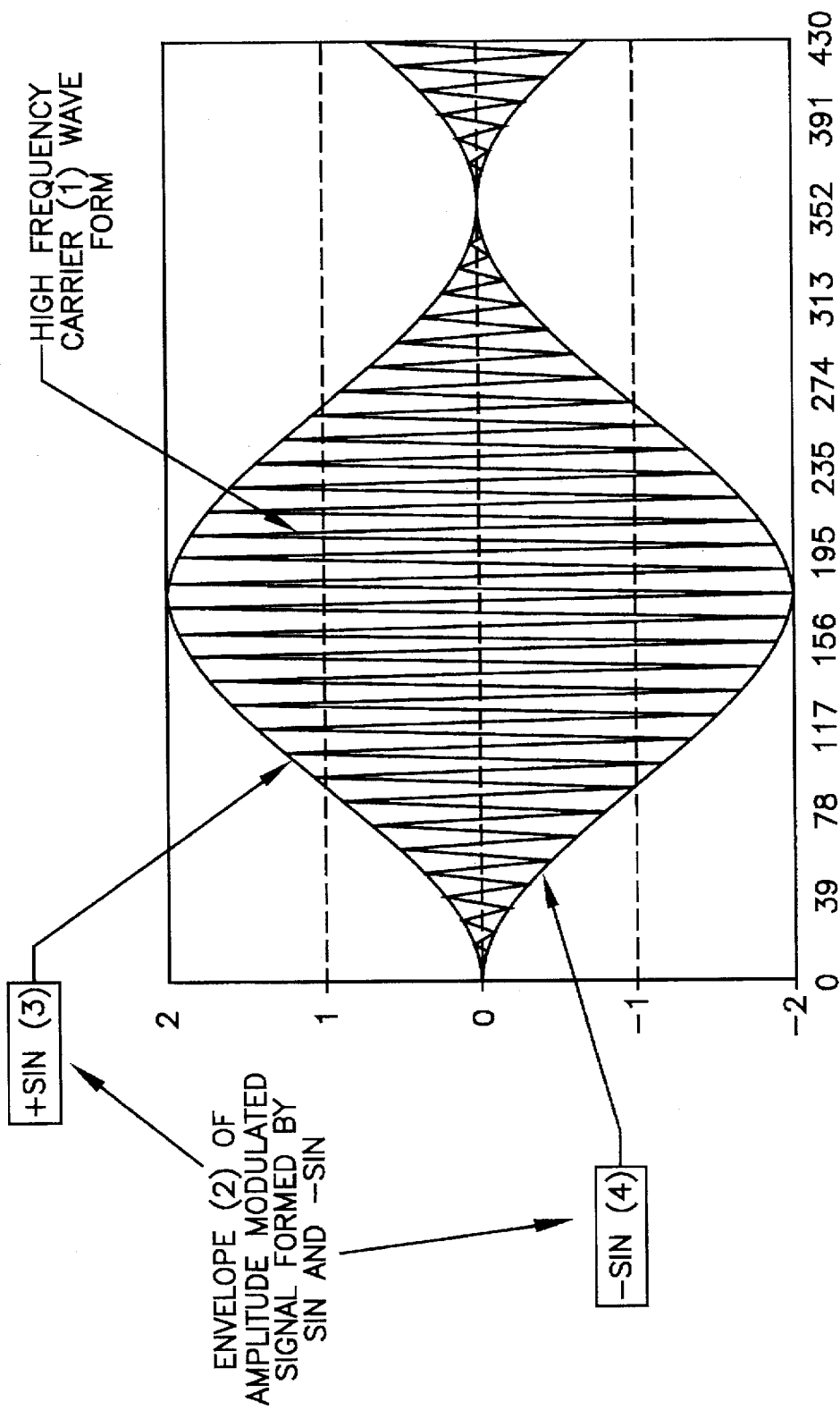
FIG. 17 shows an enlarged view of amplitude modulated signal output from a resolver.

SIN and COS are not sinusoidal signals as their names may imply. They are amplitude modulated envelopes as shown in FIG. 17, which shows what a typical resolver feedback signal (only SIN shown) looks like when a resolver is moving at a constant velocity. The X-axis is the resolver position in degrees and the Y-axis is the potential difference across the feedback winding.

This signal consists of two components which are commonly referred to as the carrier (1) and the envelope (2). The carrier is a constant frequency sinusoid. It is the result of the inductive coupling between the stator winding and the rotor windings, therefor it is of the same frequency as the REF signal. This inductive coupling changes when the rotor rotates. The changes in inductive coupling (due to rotation of the rotor) cause changes in the carrier amplitude.

These changes in carrier amplitude form what is referred to as the envelope component of the signal. This envelope is a SIN (3) and Inverse-SIN (4) with a direct phase relationship to the angular position of the resolver. The envelope is the signal of interest, however, separating it from the carrier and converting SIN and COS to a usable position format is not an easy task.

The final goal is to produce a binary word which represents the position of the resolver to the highest possible accuracy. The most important elements are high resolution (>=16-bits), high conversion accuracy (0.5 arc minute), low noise <4LSB, high bandwidth>=2000 Hz and high resolver speed>=5000 RPM.

Previously, one of two methods for converting the SIN and COS signals to a usable position format (binary word) was utilized. The first method removes the carrier signal using standard off-the-shelf demodulation circuits which are available as a single chip package (i.e. Analog Devices AD630 Balanced Modulator/Demodulator). They are inexpensive and easy to use however, there accuracy, stability, resolution and ability to reproduce a distortion free envelope will typically limit a system to around 12-bits of usable resolution. Once the signals are demodulated they must be converted to a digital format using Digital-to-Analog Converters. The position of the resolver is then calculated with a CPU by taking the ARCTAN of the COS/SIN. Real-time applications require a powerful CPU subsystem which can be very expensive. The combination of mediocre performance (from the demodulators) and a system which requires an expensive CPU subsystem makes this approach unattractive for systems which do not have that kind of processing power already available.

The second, long standing and widely used method has been to convert the SIN and COS envelopes directly to a digital position output through a type 2 servo loop tracking ratiometric converter. This method was initially implemented with discrete circuits and has been refined over several decades to hybrid components and eventually monolithic chips. Because this method uses a tracking servo loop it must be tuned to the specific application. The tracking servo loop model is subject to poor performance at one end of the tuning range and instability at the other end of the range. Typical hybrid and monolithic circuits from such sources as Analog Devices and DDC can be tuned to achieve position loop bandwidths ranging from 200 Hz to about 700 Hz. Beyond these frequencies they become unstable.

Another limitation to these types of Resolver-to-Digital Converters (RDC) is that they are speed/resolution limited. In other words, you can set them up to get high resolution or high resolver speed but, you can't get both at the same time. The typical resolver velocity at 16-bit resolution is under 1000 RPM. At this resolution the best obtainable position accuracy is about 2 arc minutes.

Figure 18:
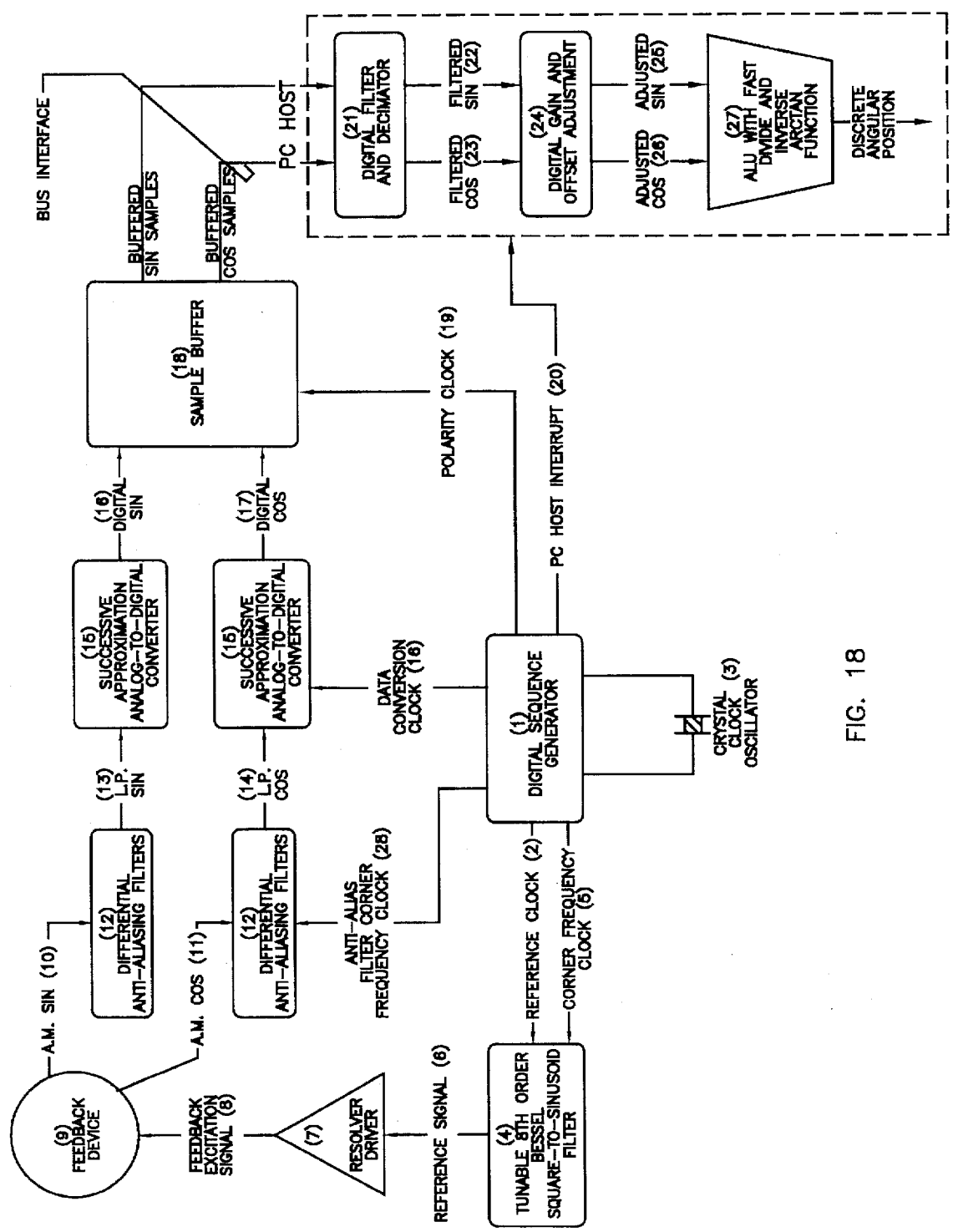
FIG. 18 is a block diagram of the present invention used to determine the discrete angular position of the relevant shafts when a resolver is used.

FIG. 18 shows the present invention for producing a binary position word from the amplitude modulated feed back of a resolver. The Feedback device 9 is any electromagnetstrictive feedback device such as a resolver, LVDT, rotary or linear Inductosyn™. The Digital Sequence Generator 1 generates a Reference Clock 2 by dividing down the output of an ultra stable crystal clock oscillator 3. This Reference Clock 2 is digital in nature and must be converted to a sinusoid by Square-to-Sinusoid Filter 4. The Filter 4 is an 8th order, clock tunable Bessel switched capacitor network. Its break frequency is determined by the Corner Frequency Clock 5 which is also generated by the Digital Sequence Generator 1.

The output of Filter 4 is the ultra stable (5 parts per million) sine-wave Reference Signal 6. This Reference Signal 6 is amplified by the Resolver Driver 7 to form a low impedance Feedback Excitation Signal 8. The Feedback Excitation Signal 8 drives the stator winding of the Feedback Device 9. The Feedback Signals called A.M. SIN 10 and A.M COS 11 are generated by means of the inductive coupling within the feedback device. These feedback signals are Amplitude Modulated signals (A.M.) as shown in FIG. 17.

The feedback signals A.M. SIN 10 and A.M. COS 11 are passed through the differential Anti-Aliasing filters 12 which attenuate any frequency components above the excitation frequency 8. The filter corner frequencies are adjustable by way of the Anti-Alias Filter Corner Frequency Clock 28. The filtered signals L.P. SIN 13 and L.P. COS 14 are then sampled by high resolution Successive Approximation Analog-to-Digital Converters (ADC) 15.

The ADCs 15 are controlled by the Digital Sequence Generator 1. The Digital Sequence Generator 1 generates pulses which have a software adjustable phase delay to compensate for the natural phase shift of any Anti-Aliasing Filters 12, the feedback device 9, the resolver driver 7 and the Square-to-Sinusoid Filter 4. These pulses are called the Data Conversion Clock.

Data Conversion Clock 16 is configured to trigger the ADCs 15 to sample the L.P. SIN and L.P. COS (amplitude modulated) signals at twice the frequency of the Feedback Excitation Signal 8. The software adjustable phase delay allows these samples to be tuned so they occur at the peaks and valleys of the carrier wave form thus demodulating the carrier from its envelope by intentionally aliasing it out.

The synchronization of the Data Conversion Clock 16 is the key to how this Resolver-to-Digital Conversion (RDC) method works. It allows the carrier to be separated from the envelope by a phenomena known as Signal Aliasing. Signal aliasing is usually a phenomena all data acquisition engineers strive to avoid. Sampling at a frequency slightly higher or lower than the signal frequency of interest will cause that signal to alias to a much lower frequency. A 10 KHz signal sampled at 9.991 Khz or 10.001 KHz will alias to 1 hz however sampling a 10 Khz signal at exactly 10 khz will alias to 0 Hz (the signal disappears). By controlling the phase relation of the sample frequency with respect to the signal frequency you can read the signal amplitude while aliasing out its frequency component thus demodulate an amplitude modulated signal.

The advantage of demodulating a signal in this manor is that there is no distortion, drift or instability introduced from analog demodulator circuits. It also requires no processor resources and it is price performance scalable, meaning higher priced, higher resolution ADCs 15 yield better performance with no other changes needed to the system.

The outputs from the ADCs 15 are Digital SIN 16 and Digital COS 17 words. These words are buffered in a sample buffer. They are stored in this buffer with a polarity bit or clock 19 which marks whether the sample is from a signal peak or from a signal valley.

In order to reduce the frequency at which the PC Host is interrupted, a decimation ratio of (# of samples/PC Host Interrupts) is implemented. This decimation ratio is scalable and will typically be run in the range of 4:1 to 16:1. The decimation ratio is used by the Digital Sequence Generator to generate the PC Host Interrupt signal 20. Each time the PC Host interrupt signal is received by the PC Host, a position conversion algorithm is executed. The position conversion algorithm reads the contents of the Sample Buffer 18 and digitally filters and decimates the data 21. The result is Filtered SIN 22 and Filtered COS 23 values whose sample rates have been decimated to match the processing rates of the PC Host Arithmetic Logic Unit ALU 27 These Filtered Signals are then digitally corrected for gain and offset errors 24. The Corrected SIN 25 and Corrected COS 26 are then used by the ALU 27 to calculate the Discrete Angular Position through the function ArcTan2(COS/SIN).

The effective bandwidth of the Resolver-to-Digital conversion is ½ of the PC Host Interrupt Frequency. Therefore, a 2000 Hz Bandwidth requires a 4000 Hz interrupt frequency. The resolution is based on the resolution of the ADCs used, 16-bit ADCs are readily available.

Resolver speed is limited only by the sampling frequency. The Maximum RPS is ¼ the sampling frequency divided by the number of resolver cycles/revolution. For a 2000 Hz band width system (sample frequency of 4000 Hz) with a 4:1 decimation ratio, and a 1 cycle/rev resolver, the sampling rate is (4000 Hz×4)/4=4000 RPS or 240,000 RPM. For a 4 cycle/rev resolver the maximum speed is 60000 RPM. The position accuracy is limited by the accuracy of the resolver. A resolver accuracy is typically around ±3 to ±12 arc minutes however, its repeatability is well within ±10 arc seconds. A single speed resolver can be easily error-mapped to within the repeatability of the resolver. Other devices such as an Inductosyn can be purchased with accuracy's better than 0.5 arc seconds and require no error mapping.

The identical circuitry and conversion algorithms can also be used to convert the analog feedback of an optical encoder to angular position. The principals of an optical encoder are very different than that of a resolver. Encoders do not need to be excited with a reference signal. They only need a D.C. voltage input to power a light source and the on-board electronics.

Figure 19:
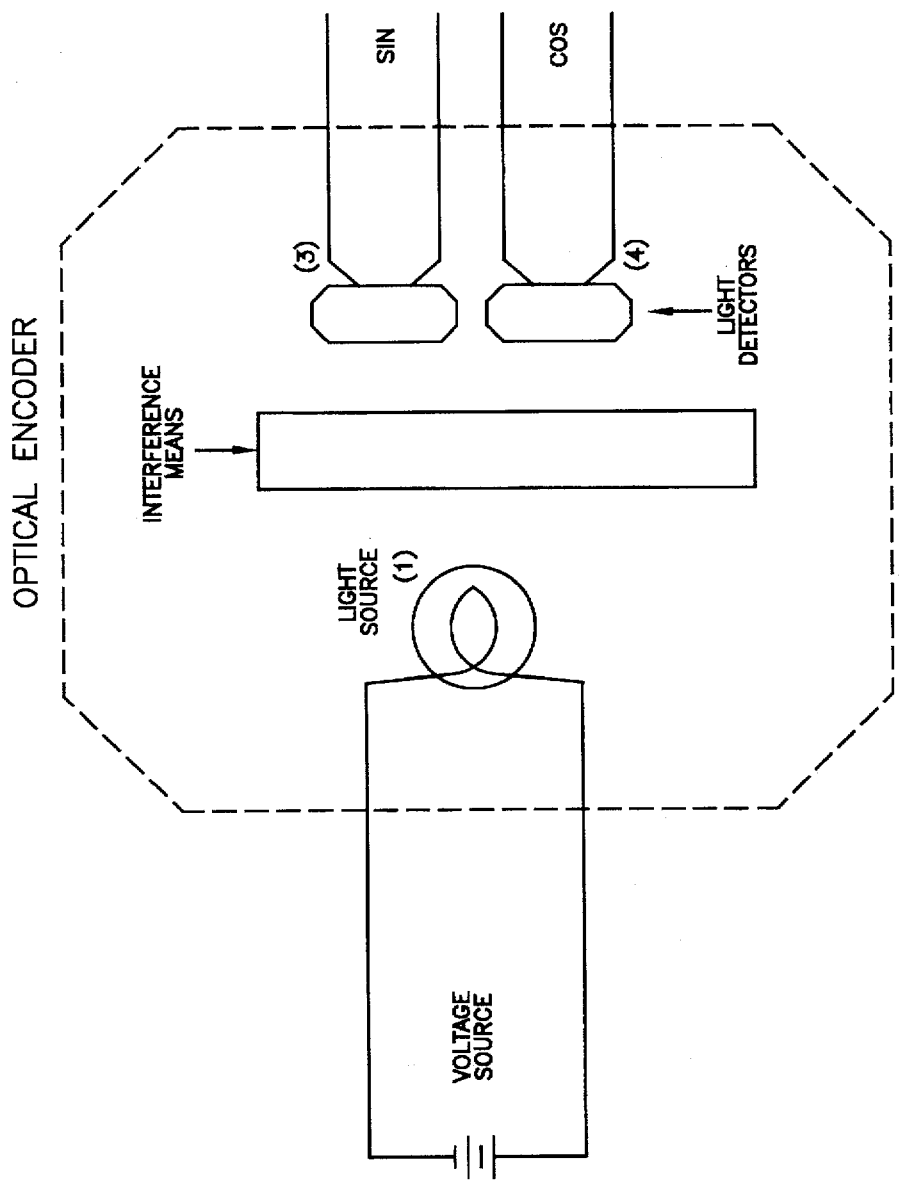
FIG. 19 is a schematical representation of an optical encoder.

FIG. 19 shows a block diagram of an optical encoder. The light source 1 delivers light through some type of Interference Means 2 which alters the light intensity as the shaft of the encoder rotates. Light Detectors 3 and 4 on the other side of the Interference Means detect the altered light and produce the signals SIN and COS. This method is more straight forward than the Electro-magnestrictive method used in the resolvers but, it introduces many delicate parts. Most encoders use glass optical devices which actually touch and rub against each other. They also all include some form of electronic printed circuit board.

One other major difference in Optical Encoders is that they typically generate any where from 50 to >50,000 electrical cycles (SIN:COS) per revolution. In contrast to resolvers which are typically manufactured to generate 1 to 6 electrical cycles per revolution. Because of this high number of cycles per revolution almost all manufactures use optical encoders in a digital manor. Instead of resolving the SIN and COS signals into discrete voltages by analog-to-digital converters, they are passed through a squaring circuit and transformed into square waves. The edges of these square waves are then counted with a simple digital up/down counter. The system resolution is then primarily determined by the encoder resolution, where as the resolution of a resolver based system is primarily determined by the Resolver-to-Digital Conversion process.

Figure 20:
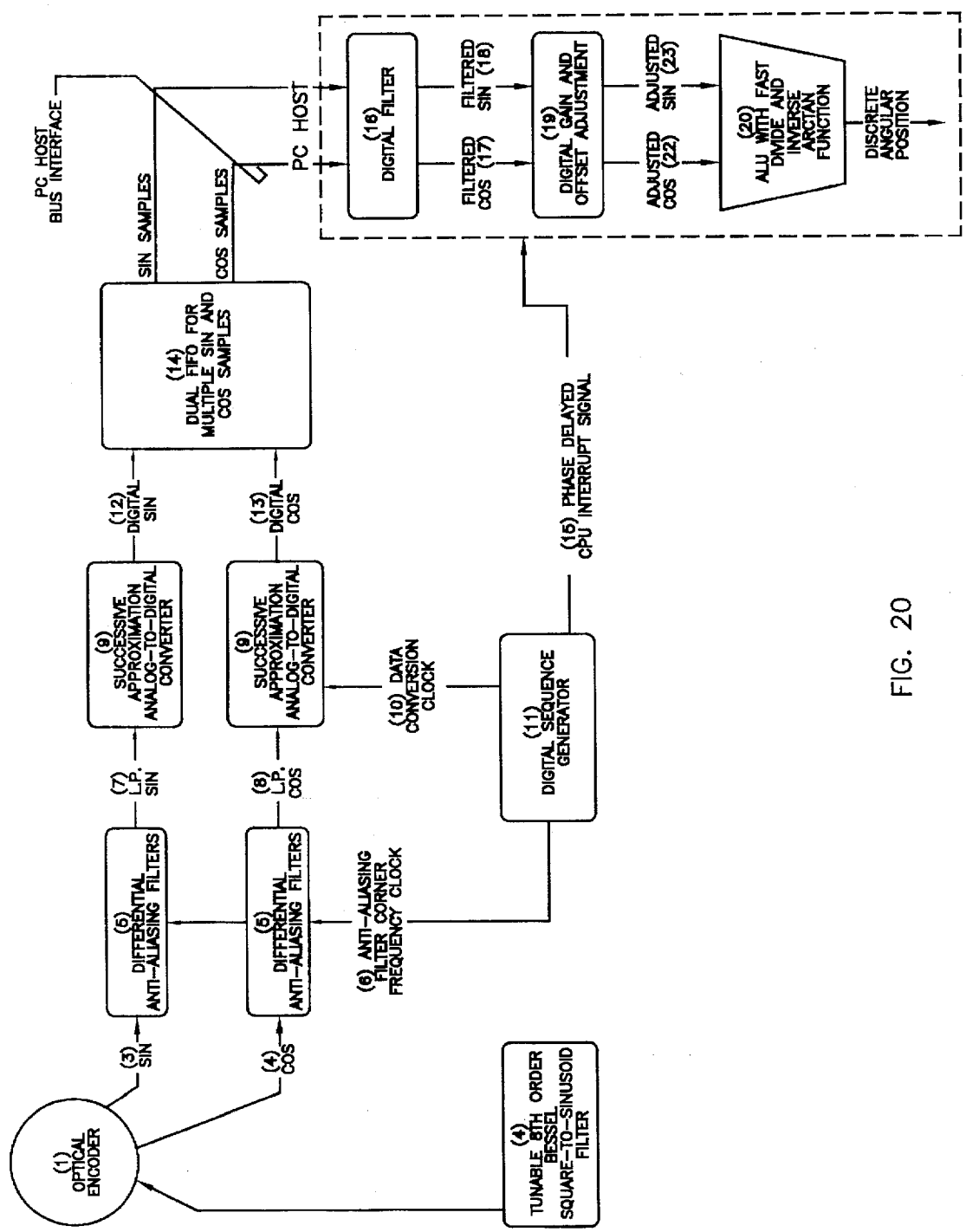
FIG. 20 is a block diagram of the present invention used to determine the discrete angular position of the relevant shafts with an optical encoder.

FIG. 20 shows how the present invention would be used with an optical encoder. The optical encoder 1 would be supplied with the necessary power 2 to operate its internal circuitry. The encoder generates SIN 3 and COS 4 signals which correspond to the angular position of the encoder input shaft. These signals go through the Differential Anti-Aliasing Filters 5 to remove any high frequency noise. The Anti-Aliasing Filters 5 are adjustable via the Anti-Alias Filter Frequency Clock 6. The filters are adjusted for a corner frequency of one half the sample frequency (holding with the nyquist criteria). The filtered signals L.P. SIN 7 and L.P. COS 8 are then sampled by the Successive Approximation ADCs 9. The sample rate is set by the Data Conversion Clock 10 which is generated from the Digital Sequence Generator 11. The Digital SIN 12 and Digital COS 13 is then buffered In the Sample Buffer dual FIFO 14.

In order to reduce the frequency at which the PC Host is interrupted, a decimation ratio of (# of samples/PC Host Interrupts) is implemented. This decimation ratio is scalable and will typically be run in the range of 4:1 to 16:1. The decimation ratio is used by the Digital Sequence Generator 11 to generate the PC Host Interrupt signal 15.

Each time the PC Host interrupt signal is received by the PC Host, a position conversion algorithm is executed. The position conversion algorithm reads the contents of the Sample Buffer dual FIFO 14 and digitally filters and decimates the data 16. The result is Filtered SIN 17 and Filtered COS 18 values who's sample rates have been decimated to match the processing rates of the PC Host Arithmetic Logic Unit ALU 20 These Filtered Signals are then digitally corrected for gain and offset errors 19. The Corrected SIN 22 and Corrected COS 23 are then used by the ALU 20 to calculate the Discrete Angular Position through the function ArcTan2(COS/SIN).

This method of reading an encoder has two main advantages. The analog encoder signals are being resolved into many fine increments (over 65,000 with a 16-bit ADC) instead of being converted to a digital signal. This means a 100 cycle/revolution encoder will have a final resolution of over 6.5 million bits per revolution ($100 \times 2^{16} = 6,553600$). A traditional up/down encoder counter circuit would only have a resolution of 400 (100×4 edges per cycle=400). This leads to the second advantage which is that low resolution encoders (50 to 250 cycles/rev) are available with durable steel internal components instead of the glass optical components in high resolution encoders. The lower resolution encoders are also less expensive.

Figure 21:
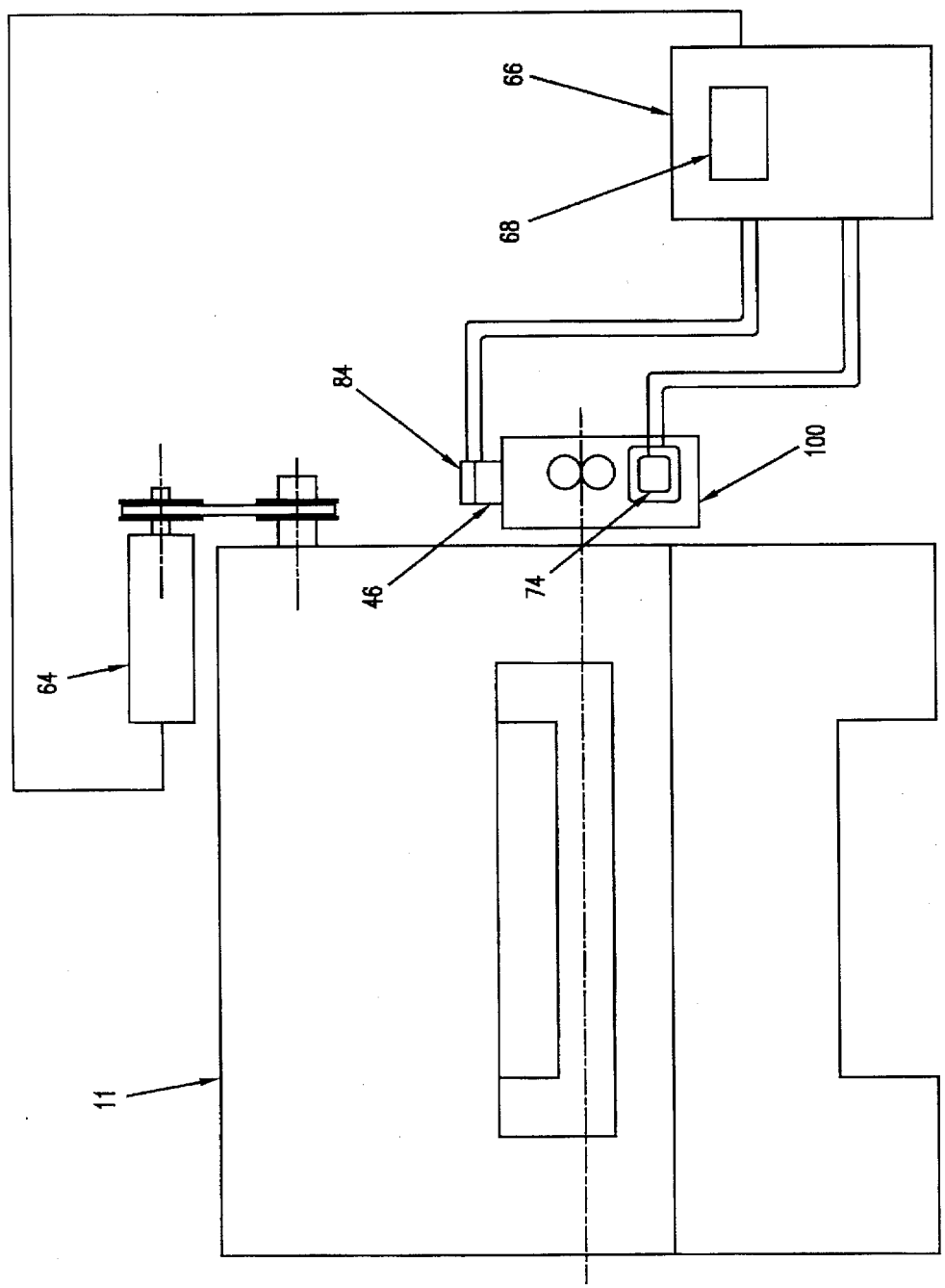
FIG. 21 shows is a schematic showing further aspects of the present invention.

As shown schematically in FIG. 21, sensor means 64 monitors certain conditions of the press 11, e.g., the angular orientation of the press crankshaft, that reflect the onset of a selected press cycle phase, such as, piloting. Sensor means 74 and 84 also monitor, respectively, certain conditions of drive roller 14 and actuator drive means 46. Sensor means 64, 74 and 84 transmit a signal to a control means 66 such as a PC Host, microprocessor, or the like, whereby angular orientation of the press cycle, the drive roller, and actuator drive means are constantly monitored by control means 66.

Control means 66 generates a command signal associated with the angular position of the crankshaft of press 11 onset of the selected press cycle phase and transmits that command signal to actuator drive means 46 which in turn adjusts the infinitely variable actuators 38 of press feed 100 a predetermined amount to move the stock material engagement means both toward and away from the stock material, in a predetermined sequence with the angular position of the press 11. Control means 66 also generates a command signal associated with the feeding of stock and transmits that command signal to the drive means for feed roller 14 which in turn advances the stock material a predetermined amount and in a predetermined sequence with the angular position of the press 11. Thus control means 66 by virtue of its continuous monitoring of the press cycle, the drive roller, and the actuator drive means 46, may synchronize the movement of the material through press feed 100 and the releasing of the material for piloting. This positional synchronization of the feed functions to the press ensures that at any angular position of the press 11, the position of the feed rolls and thus the material will be at its predisposed location regardless of press speed or the direction of rotation. Likewise the release of the material from between the feed rollers is positionally synchronized to the position of the crankshaft of press 11 at all position of the crankshaft. In addition the positional synchronization of the feed functions is infinitely adjustable by virtue of the programmability of control means FIG. 21 also depicts data input means 68 such as a conventional computer keyboard. Through data input means 68, data such as, for example, stock material thickness, cross-sectional configuration, hardness and composition, and press feed control data including, but not limited to, nominal stock material engagement means spacing and desired compressive force to be applied by the stock material engagement means, may be input into control means 66. Additionally, the length of the stock material to be fed for each press cycle, and other variables, etc., may be input into control means 66. In other respects, the operation of press feed 100 is essentially the same as press feed 10. Although actuator drive means 46, sensor means 64, 74, and 84, control means 66, and data input means 68 are depicted in connection with press feed 100, it should be noted that such elements can be utilized with press feed 10, 110, 120 and 130 described hereinabove.

In accordance with the present invention, the operation of the press feed may be precisely tailored to the peculiarities of the stock material during die set up and adjustments may be made during press feed operation without having to stop the press feed. Thus, under all operating conditions the press feed of the present invention may function in synchronization with any desired phase of the press cycle while assuring precisely controlled and firm but gentle handling of the stock material throughout the run.

Figure 22:
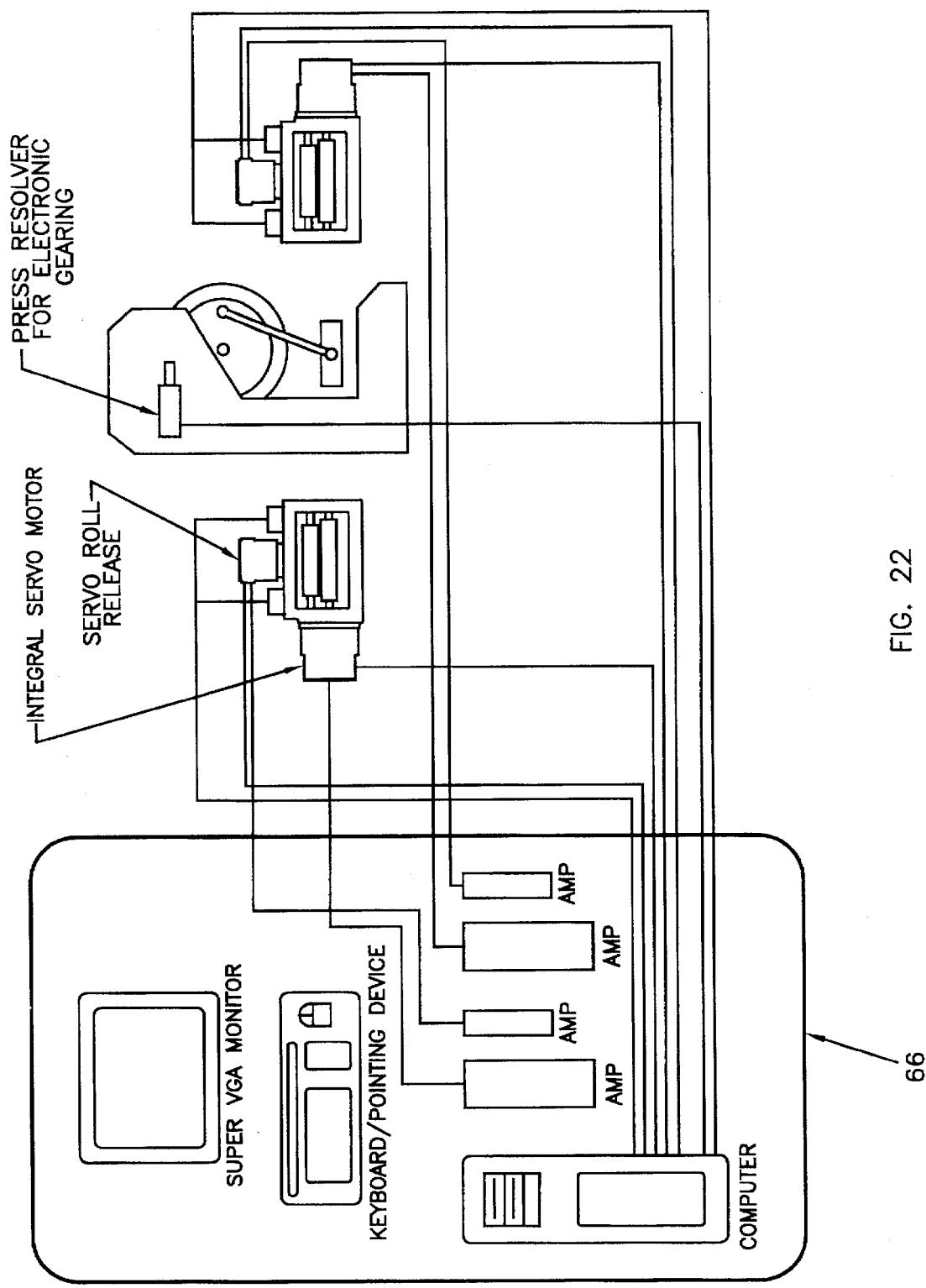
FIG. 22 schematically shows the operation of the present invention in a multi-dimensional axis environment.

FIG. 22 schematically depicts the operation of the present invention in an enviroment with multi-dimensional control axes. As can be seen in the figure, a press feed with the roll release mechanism of the present invention is located on either side of the press. This permits the application of motive power to the stock material from more than one position, which may be advantageous depending upon the stock material. This particular diagram depicts an enviroment with four control axes, however, any number of axes may be used in accordance with the present invention.

Figure 23:
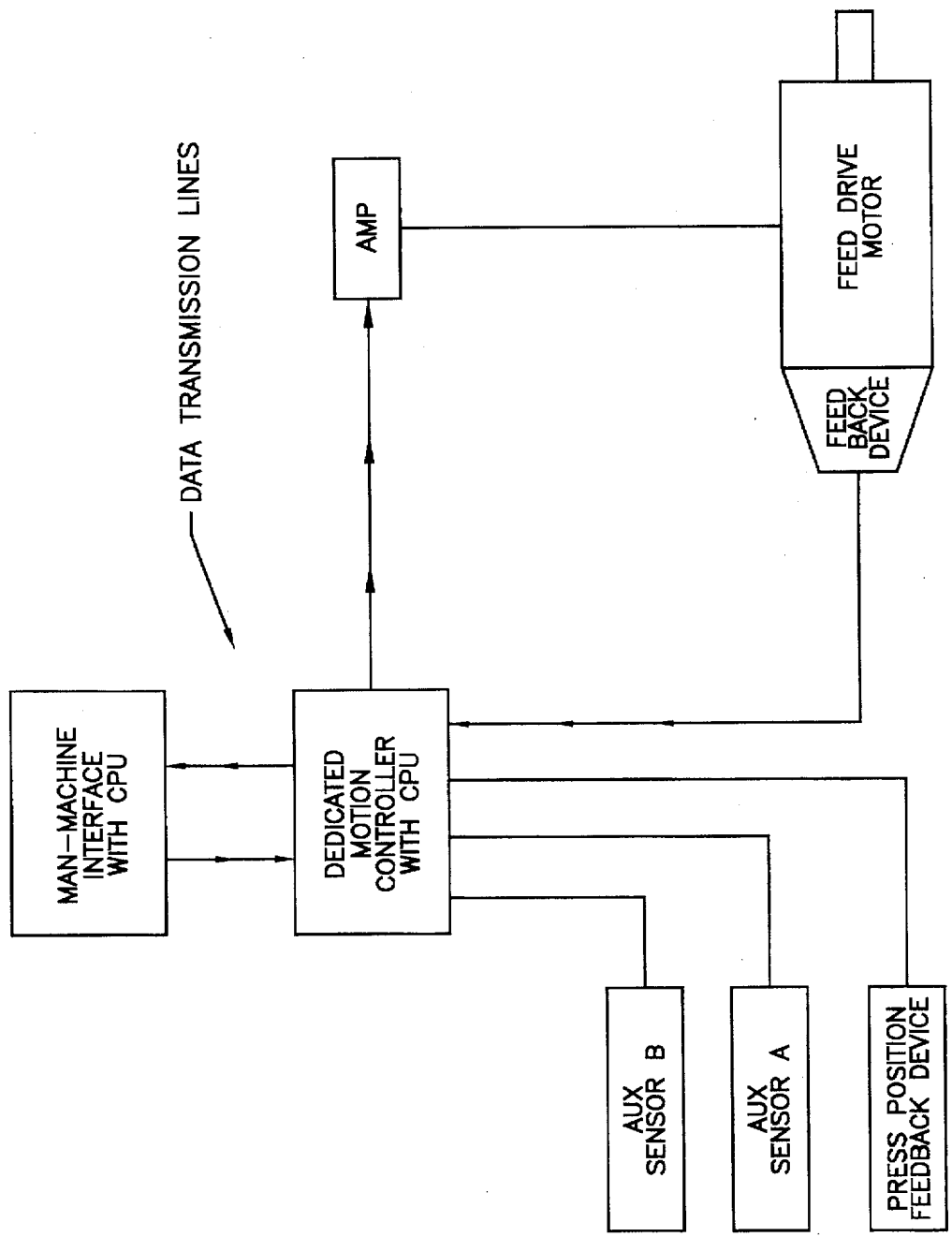
FIG. 23 shows the prior art used in connection with system control and the man machine interface.

FIG. 23 schematically shows that with the conventional method of controlling servo motors a dedicated motion controller is used for each servo motor within the system. A system may contain multiple servo motors which may be controlled by multiple dedicated motion controllers. Whatever the number of dedicated motion controllers, however, each controller communicates via data transmission lines with a man-machine interface. The conventional man-machine interface has limited capabilities, such as it displays certain control signals, displays only a limited number of control signals at one time, is not quickly configurable and is limited by the speed of the data transmission lines.

Figure 24:
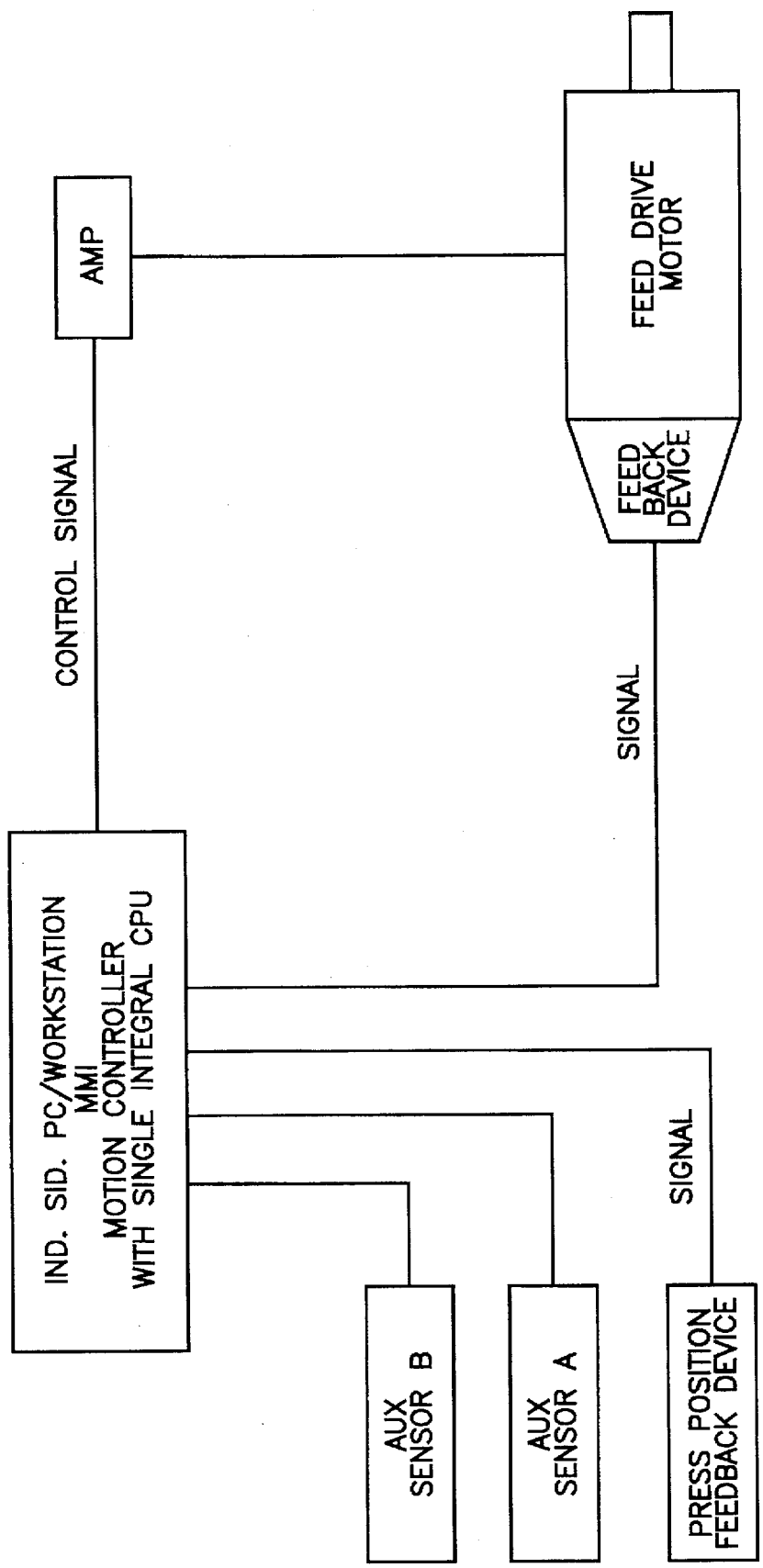
FIG. 24 shows the system control and man machine interface of the present invention.

FIG. 24 schematically shows a presently preferred embodiment of the present invention in which the motion controller and man-machine interface are combined in accordance with the invention. Major advantages of the combined man-machine interface and motion controller of the present invention include the number of control signals which can displayed, the speed with which the signals are controlled (for all practical purposes the signals are displayed in real time), the ability to quickly and easily customize the output display of the man-machine interface, decreasing the number of component parts, and decreasing the cost.

In accordance with the present invention, the controller schematically shown in FIG. 24 utilizes a single microprocessor for decoding and interpretation of press position and feed drive motor feedback signals, for prompting the user for input and interpreting the user input, and for generating motor control signals. It is advantageous to minimize the number of microprocessors used in the control system and presently, it is preferred to use an industry standard personal computer (PC) not only for the man-machine interface, but also the real time data acquisition, processing and control.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A press feed capable of being driven in synchronization with a press, said press feed comprising:
   means for sensing a selected press cycle phase of said press;
   means for engaging stock material adapted to be fed by said press feed to said press; and
   release means capable of infinite variation during the feeding of said stock material to said press connected to said means for engaging stock material and communicating with said sensing means, said release means being operable to move said means for engaging stock material in a first direction relative to said stock material responsive to detection by said sensing means of the onset of said selected press cycle phase to cause separation of the means for engaging from said stock material and for moving said means for engaging stock material in a direction generally opposite said first direction responsive to detection by said sensing means of the termination of said selected press cycle phase to cause the means for engaging to reengage with said stock material.

2. The press feed of claim 1, wherein said means for engaging comprises:

a first feed roller;

a second feed roller disposed relative to said first feed roller such that stock material may pass between the two feed rollers;

driving means integral with said first feed roller.

3. The means for engaging of claim 2, wherein said first feed roller has a feed roll shaft and said driving means comprises a high torque motor constructed directly on the feed roll shaft.

4. The press feed of claim 1 wherein said selected press cycle phase is during piloting of said stock material in said press.

5. The press feed of claim 1 wherein said means for engaging stock material comprise means for feeding said stock material to said press.

6. The press feed of claim 1 wherein said release means comprise:

at least one rotatable screw; and means for rotating said at least one rotatable screw in opposite directions.

7. The press feed of claim 6 wherein said at least one rotatable screw comprises two rotatable screws.

8. The press feed of claim 1 wherein said release means comprises:

a wedge;

power means operatively connected to the wedge for linearly moving the wedge;

a cam follower which is operatively connected to the means for engaging stock material;

wherein the movement of the means for engaging stock material is in relation to the linear movement of the wedge.

9. The press feed of claim 1 wherein said release means comprises at least one servo controlled hydraulic cylinder.

10. The press feed of claim 1 wherein said release means comprises a valve arrangement.

11. The press feed of claim 1 wherein said release means comprises at least one linear servo motor.

12. The press feed of claim 1 wherein said release means comprises at least one linear stepper motor.

13. The press feed of claim 1 wherein said release means comprises at least one voice coil servo motor.

14. The press feed of claim 1 wherein said release means comprises at least one linear voice coil motor.

15. The press feed of claim 1 wherein said release means comprises at least one solenoid style linear actuator.

16. The press feed of claim 1 further comprising means for controlling the operation of said release means during at least one of operation or stoppage of said press feed.

17. The press feed of claim 16 wherein said controlling means is operable to receive a first signal from said sensing means indicative of said onset of said selected press cycle phase and to generate and transmit a first command signal to power means drivenly connected to said release means to move said means for engaging stock material in said first direction, said controlling means being further operable to receive a second signal from said sensing means indicative of said termination of said selected press cycle phase and to generate and transmit a second command signal to said power means to move said means of engaging stock material in said second direction.

18. The press feed of claim 1 further comprising adjustable pressure means connected to said means for engaging stock material and communicating with said sensing said and release means, said adjustable pressure means being operable to move said means for engaging stock material only in a direction generally opposite said first direction responsive to detection by said sensing means of the termination of said selected press cycle phase.

19. The press feed of claim 18 wherein said adjustable pressure means is an air bag.

20. The press feed of claim 18 wherein said selected press cycle phase is during piloting of said stock material in said press.

21. The press feed of claim 18 wherein said means for engaging stock material comprise means for feeding said stock material to said press.

22. The press feed of claim 18 wherein said release means comprise:

at least one rotatable screw; and means for rotating said at least one rotatable screw in opposite directions.

23. The press feed of claim 22 wherein said at least one rotatable screw comprises two rotatable screws.

24. The press feed of claim 18 wherein said release means comprises:

a wedge;

power means operatively connected to the wedge for linearly moving the wedge;

a cam follower which is operatively connected to the means for engaging stock material;

wherein the movement of the means for engaging stock material is in relation to the linear movement of the wedge.

25. The press feed of claim 18 wherein said release means comprises at least one servo controlled hydraulic cylinder.

26. The press feed of claim 18 wherein said release means comprises a valve arrangement.

27. The press feed of claim 18 wherein said release means comprises at least one linear servo motor.

28. The press feed of claim 18 wherein said release means comprises at least one linear stepper motor.

29. The press feed of claim 18 wherein said release means comprises at least one voice coil servo motor.

30. The press feed of claim 18 wherein said release means comprises at least one linear voice coil motor.

31. The press feed of claim 18 wherein said release means comprises at least one solenoid style linear actuator.

32. The press feed of claim 18 further comprising means for controlling the operation of said release means during at least one of operation or stoppage of said press feed.

33. The press feed of claim 32 wherein said controlling means is operable to receive a first signal from said sensing means indicative of said onset of said selected press cycle phase and to generate and transmit a first command signal to power means drivenly connected to said release means to move said means for engaging stock material in said first direction, said controlling means being further operable to receive a second signal from said sensing means indicative of said termination of said selected press cycle phase and to generate and transmit a second command signal to said power means to move said means of engaging stock material in said second direction.

34. A press feed for use with a high speed press, comprising:

means for determining the position of the press;

a first feed roller formed integral with driving means;

a second feed roller;

means for positioning said second feed roller so that motive force is not provided to stock material between said first and second feed rollers;

means for releasing said first and second feed rollers capable of infinite variation during the feeding of said stock material to said press;

means for synchronizing press position, feed roller release, and activation of first feed roller driving means.

35. The press feed of claim 34, wherein said synchronization means comprises a microprocessor.

36. The press feed of claim 34, wherein said synchronization means comprises a personal computer.

37. A system for controlling a press feed used with a press, comprising:

means for sensing the position of a press shaft;

means for positioning a feed roll for feeding stock material;

means for sensing the position of said feed roll of the press feed;

means for a user to input control parameters;

means for generating control signals to a feed roll drive actuator based upon said sensed positions and user input; and means for releasing said feed roll capable of infinite variation during the feeding of stock material to said press.

38. The control system of claim 37, wherein a single microprocessor is used for generating said control signals.

39. The control system of claim 37, wherein a single microprocessor is used to accept user input and generate control signals.

40. The control system of claim 37, wherein the user input means and control signal generation means is an industry standard personal computer.

* * * * *